(12) United States Patent
Grabarnik et al.

(10) Patent No.: US 7,475,150 B2
(45) Date of Patent: Jan. 6, 2009

(54) METHOD OF GENERATING A COMMON EVENT FORMAT REPRESENTATION OF INFORMATION FROM A PLURALITY OF MESSAGES USING RULE-BASED DIRECTIVES AND COMPUTER KEYS

(75) Inventors: Genady Grabarnik, Scarsdale, NY (US); Sheng Ma, Briarcliff, NY (US); Abdolreza Salahshour, Raleigh, NC (US); Balan Subramanian, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 10/935,035

(22) Filed: Sep. 7, 2004

(65) Prior Publication Data

US 2006/0053477 A1    Mar. 9, 2006

(51) Int. Cl.
*G06F 15/16* (2006.01)
*G06F 15/173* (2006.01)
*G06F 9/54* (2006.01)

(52) U.S. Cl. .................. 709/228; 709/223; 709/246; 709/313; 709/318

(58) Field of Classification Search ............ 709/223, 709/228, 246, 100; 719/313, 318; 707/3, 707/100; 713/201; 714/48
See application file for complete search history.

(56) References Cited

U.S. PATENT DOCUMENTS 7,139,938 B2 * 11/2006 Marwaha .................... 714/48

(Continued)

FOREIGN PATENT DOCUMENTS

WO    WO0225440 A2    3/2002

OTHER PUBLICATIONS

Bridgewater, David, "Standardize Messages With The Common Base Event Model," http://www-106.ibm.com/developerworks/library/ac-chel/index.html, Feb. 17, 2004.

(Continued)

*Primary Examiner*—Quang N. Nguyen
(74) *Attorney, Agent, or Firm*—Stephen A. Calogero; Dillon & Yudell LLP

(57) ABSTRACT

Methods, systems, and computer program products for generating a common event format representation of information from a plurality of messages include parsing a rule associated with a current message to determine if a property of a common event format representation for the current message is to be populated with a property value from a previous message. If the rule specifies to obtain the property value from the previous message, the property value is obtained from the previous message and the common event format representation for the current message is populated with the obtained property value from the previous message. The property value may be obtained by generating a computed key based on properties of the current message that are common to the previous message, and identifying the previous message based on the key of the current message. The rule associated with the current message may also be parsed to determine if the property of the common event format representation for the current message is to be populated with a property value determined by specified code. If the rule specifies to obtain the property value using the specified code, the property value is obtained using the specified code and the common event format representation for the current message is populated with the obtained property value obtained using the specified code.

1 Claim, 9 Drawing Sheets

U.S. PATENT DOCUMENTS

2003/0126181 A1* 7/2003 Young .................. 709/100
2004/0068501 A1    4/2004 McGoveran .............. 707/8
2004/0215629 A1* 10/2004 Dettinger et al. ........ 707/100
2004/0243567 A1* 12/2004 Levy ................... 707/3
2005/0015619 A1*  1/2005 Lee .................... 713/201

OTHER PUBLICATIONS

Chase, Nicholas, "An Autonomic Computing Roadmap," http://www-106.ibm.com/developerworks/ac-roadmap/?ca , Feb. 17, 2004.

Salashour et al., *Generic Log Adapter For Autonomic Computer User's Guide*, Oct. 19, 2003.

* cited by examiner

METHOD OF GENERATING A COMMON EVENT FORMAT REPRESENTATION OF INFORMATION FROM A PLURALITY OF MESSAGES USING RULE-BASED DIRECTIVES AND COMPUTER KEYS

BACKGROUND OF THE INVENTION

The present invention relates to computer networks, and more particularly, to the management of components in computer networks.

Information Technology (IT) systems, methods and computer program products, including, for example, computer networks, have grown increasingly complex with the use of distributed client/server applications, heterogeneous platforms and/or multiple protocols all on a single physical backbone. This increase in the complexity of systems may make solution management more complex. Solutions may include collections of software and hardware components to address specific customer business requirements. In a solution, problem determination (PD) may include problem detection, isolation, and resolution using messages/events generated by components participating in a solution across multiplicity of platforms.

In conventional systems, components, such as applications, middleware, hardware devices and the like, generate data that represents the status of the component. This component status data will, typically, be consumed by some management function utilized to monitor the system and/or for problem analysis/resolution. The management function may, for example, be a user reading a log file or a management application that is consuming the data for analysis and/or display. In conventional systems, components and component owners are responsible for determining what data is provided, in terms of format, content, and/or completeness, typically resulting in differing component status formats.

One difficulty that may arise from the use of differing component status formats is in the analysis of problems for differing components or from different versions of a component. Knowledge bases have conventionally been used to map component status data, such as error log messages, that are reported by components to symptoms and eventually to fixes for problems. For example, there are symptom databases utilized by International Business Machines Corporation, Armonk, N.Y., that map WebSphere error log messages to symptoms and fixes. These databases typically work on the assumption that if you see a specified error message (e.g., message "123") from a specified component (e.g., component "XYZ"), then a particular symptom is occurring (e.g., the performance is slow) and a predefined remedy (e.g., increase the parameter "buffsize" to 10) will likely fix the problem.

However, the use of differing component status formats in the analysis of problems for differing components or from different versions of a component may make it difficult to write correlation rules to obtain status information about the system from data provided by two different components. In other words, message/event logs generated by components may be invariably product-centric, and may adhere to standards and terminology that are unique to a particular vendor (or even a particular application). For example, if a first vendor of a monitoring tool includes a certain status information field when reporting the amount of occupied memory of a device, and a second vendor does not include the same field or includes the field but calls it something different or formats it differently, the information provided by the devices may be difficult to use. In order to reduce the cost of problem analysis and increase the speed and accuracy of problem resolution, it may be helpful for diagnostic data from all components in the solution to be accessible in a consistent manner. As such, the formats of the fields in each message may need to be converted to a common format before the information in the fields may be used efficiently.

In automatic computing system management, also known as autonomic computing, an adapter may be used to convert messages from various components into a common format. For example, IBM's Generic Log Adapter (GLA) may be used in autonomic computing systems to collect data from different data sources with many different formats. The GLA is a rule-based engine that can translate data from different native log formats into a standard format, known as the Common Base Event format (CBE), through rules written using regular expressions—a common mechanism used traditionally for search functions. In the GLA, rules can be written on a per property basis. Therefore, a rule may describe a mechanism to extract a portion of the input string and populate a field of the Common Base Event that is provided when all the rules for all the properties have been applied to the input string in the native format. A single property may have a number of associated rules, because different strings in the same native log/event format might represent the same information in different ways or in different positions within the complete data string.

The Generic Log Adapter may utilize regular expressions to describe the parsing rules which may allow decomposition and reassembly of proprietary product messages/log files into CBE format. One advantage of using a generic adapter is that the parsing rules can be customized as required by a particular vendor or end-user, and also can be extended to include new message types added to the logs and include application level messages that may manifest themselves in system level logs. For example, while it may be possible to write a parsing component (generic or static) for IBM's WebSphere Application Server (WAS), it may parse only message types in WAS. As such, a message from another application which may appear in the same log file may not be parsed using the same code/rules. By using a generic adapter, the rules can be modified to fit new message types that were not known at design time. The generic adapter may use regular expressions because they are standardized, and may provide powerful constructs to match and extract matched entities from input messages.

In some cases, however, it may be difficult to write rules using regular expressions to extract or assign values to some properties. This may be due to a number of factors. First, it may not be possible to derive the information from the input message. For example, a globally unique identification (e.g., globalInstanceId) often does not exist for message log entries, which may make it impractical to define such an ID statistically per log entry or from different fields in the input log message. Second, the data extracted from the input message may require some manipulation that may not be possible using any of the regular expressions constructs. For example, in Cisco (IOS) log files, the host names may often be provided as aliases. Converting these aliases into actual IP addresses may require some operations that are not within the scope of the generic adapter, because a specific operation may be used for the specific log file. Third, while it may be possible to perform certain operations using regular expressions, it may be preferable to use code. A typical dilemma arises when half of the parsing can be done more effectively with regular expressions and half with regular code. While code may be faster in these cases, it is also static. The issue may become more complex if the code requires some portions of the input message as parameters, which may have to be extracted using regular expressions and/or string operations. Fourth, state information may be required to be maintained between input messages, which may be difficult when using regular expressions or rule based parsing because each of the rules may be executed in isolation. While it may be possible to maintain state information within the execution scope of a rule, it may not be possible to do so across rules involving different regular expressions. Finally, the person writing the rules may not have an intimate knowledge about particular fields. In such cases, he/she may choose to use the GLA's better understanding of the properties to fill those fields. He/she may also aid the Generic Adapter by providing regular expression to extract the message portions that may be of interest to the Generic Adapter for filling the fields, while allowing the adapter itself to perform final transformations before filling the particular fields. By working in such a collaborative fashion, common knowledge available within the adapter can be leveraged with scenario/case specific knowledge provided by rules written by a domain expert/end user.

SUMMARY OF THE INVENTION

Embodiments of the present invention provide methods, systems and/or computer program products for generating a common event format representation of information from a plurality of messages. In some embodiments, the method may include parsing a rule associated with a current message to determine if a property of a common event format representation for the current message is to be populated with a property value from a previous message, obtaining the property value from the previous message if the rule specifies to obtain the property value from the previous message, and populating the common event format representation for the current message with the obtained property value from the previous message. In other embodiments, obtaining the property value may include generating a computed key based on properties of the current message that are common to the previous message, and identifying the previous message based on the key of the current message. In further embodiments, the method may include parsing the rule associated with the current message to determine if the property of the common event format representation for the current message is to be populated with a property value determined by specified code, obtaining the property value using the specified code if the rule specifies to obtain the property value using the specified code, and populating the common event format representation for the current message with the obtained property value obtained using the specified code.

In additional embodiments, methods, systems and/or computer program products for generating a common event format representation of information from a plurality of messages may include parsing a rule associated with a current message to identify regular expressions therein, parsing the rule to determine if a property of the common event format representation for the current message is to be populated with a property value determined by specified code, obtaining the property value using the specified code if the rule specifies to obtain the property value using the specified code, and populating the common event format representation for the current message with the obtained property value. Execution of the specified code may be based on execution of at least one of the identified regular expressions. In further embodiments, execution of at least one of the identified regular expressions may be based on execution of the specified code.

As will further be appreciated by those of skill in the art, while described above primarily with reference to method aspects, the present invention may be embodied as methods, apparatus/systems and/or computer program products.

DETAILED DESCRIPTION OF EMBODIMENTS OF THE INVENTION

Figure 1:
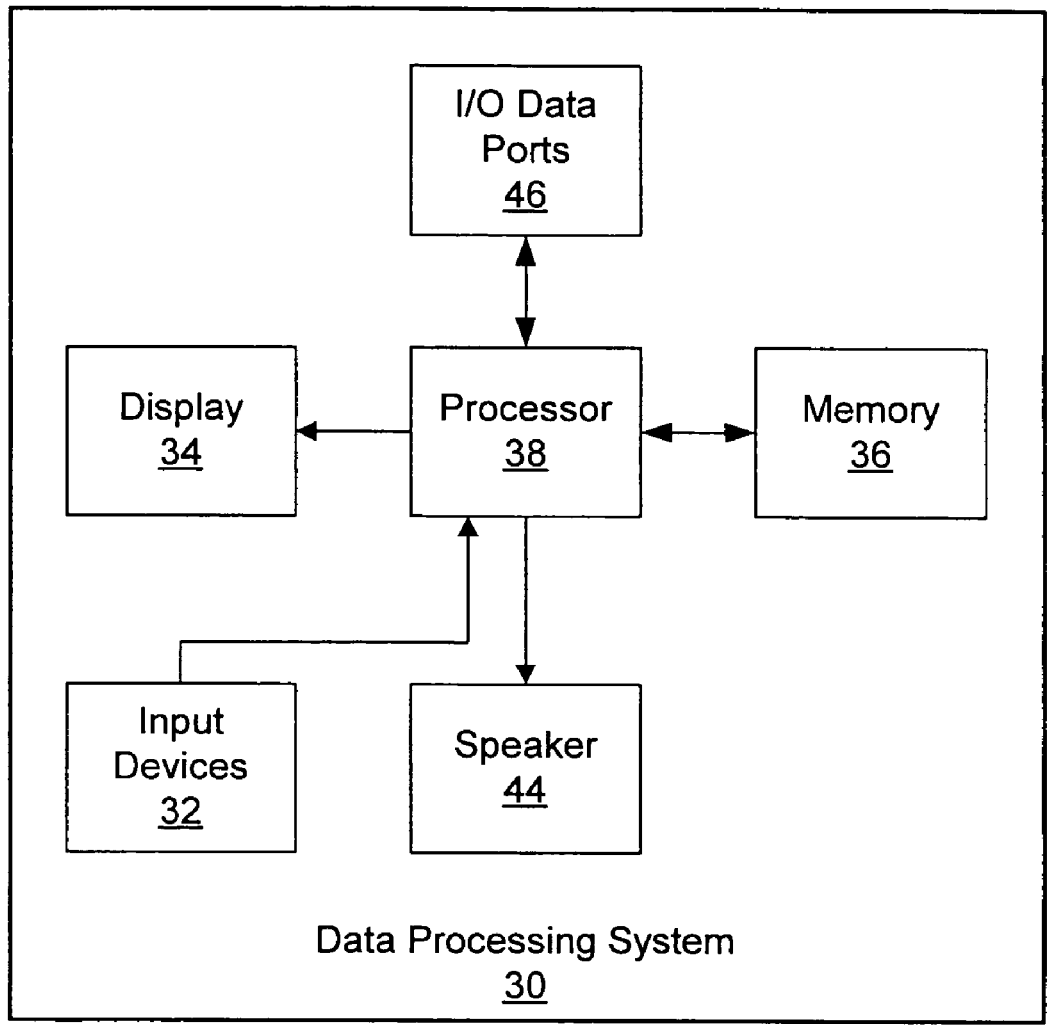
FIG. 1 is a block diagram of a data processing system suitable for use in a system according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. A used herein the term and/or includes any and all combinations of one or more of the associated listed items.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to FIGS. 1 through 8. Some embodiments of the present invention provide methods, systems and/or computer program products for generating a common event format representation of information from a plurality of messages. The method may include parsing a rule associated with a current message to determine if a property of a common event format representation for the current message is to be populated with a property value from a previous message, obtaining the property value from the previous message if the rule specifies to obtain the property value from the previous message, and populating the common event format representation for the current message with the obtained property value from the previous message.

In some embodiments, obtaining the property value from the previous message may include generating a computed key based on properties of the current message, and identifying the previous message based on the key of the current message. Generating a key may include identifying properties in the current message that are common to the previous message, and combining the identified properties to generate the key.

In further embodiments, generating a key may further include generating only a portion of the key sufficient to identify a previous message. Also, identifying the previous message may include identifying the previous message based on the portion of the key. In other embodiments, identifying the previous message may include generating a key for the previous message based on properties of the previous message, and comparing the key for the previous message with the key for the current message.

In some embodiments, the method may further include storing the populated the common event format representation as the current message.

In other embodiments, obtaining the property value from the previous message may include obtaining the property value from an immediately preceding message if the rule specifies to obtain the property value from the immediately preceding message or if obtaining the property value from the previous message is unsuccessful. In some embodiments, the obtained property value from the previous message may provide further directives for determining the property of the common event format representation for the current message.

In further embodiments according to the present invention, the method may include parsing the rule associated with the current message to determine if the property of the common event format representation for the current message is to be populated with a property value determined by specified code, obtaining the property value using the specified code if the rule specifies to obtain the property value using the specified code, and populating the common event format representation for the current message with the obtained property value obtained using the specified code. As such, additional embodiments of the present invention may provide support for special directives, which may be embedded within rules, that may be used to direct the adapter to use specified code fragments, built-in or user-defined, to provide values for specific properties in a common event format representation at runtime.

In some embodiments, the rule may specify obtaining the property value from the specified code if obtaining the property value from the previous message is unsuccessful. In other embodiments, the specified code may call a class and a particular method within the class to determine the property value.

In further embodiments, obtaining the property value from the specified code may include re-using a property value from a previous execution of the specified code if the same class, method, and parameters as the previous execution are specified. In other embodiments, the specified code may create a new object to call a method to determine the property value. In further embodiments, the method may include storing the new object against a called class, method, and parameters.

According to still further embodiments of the present invention, a system for generating a common event format representation of information from a plurality of messages may include an adapter configured to parse a rule associated with a current message to determine if a property of a common event format representation for the current message is to be populated with a property value from a previous message, obtain the property value from the previous message if the rule specifies to obtain the property value from the previous message, and populate the common event format representation for the current message with the obtained property value from the previous message.

In some embodiments, the adapter may be further configured to parse the rule associated with the current message to determine if the property of the common event format representation for the current message is to be populated with a property value determined by specified code, obtain the property value using the specified code if the rule specifies to obtain the property value using the specified code, and populate the common event format representation for the current message with the obtained property value obtained using the specified code.

In further embodiments, a computer program product for generating a common event format representation of information from a plurality of messages, may include a computer readable medium having computer readable program code embodied therein. The computer readable program code may include computer readable program code configured to parse a rule associated with a current message to determine if a property of a common event format representation for the current message is to be populated with a property value from a previous message, computer readable program code configured to obtain the property value from the previous message if the rule specifies to obtain the property value from the previous message, and computer readable program code configured to populate the common event format representation for the current message with the obtained property value from the previous message.

In other embodiments, the computer program product may include computer readable program code configured to parse the rule associated with the current message to determine if the property of the common event format representation for the current message is to be populated with a property value determined by specified code, computer readable program code configured to obtain the property value using the specified code if the rule specifies to obtain the property value using the specified code, and computer readable program code configured to populate the common event format representation for the current message with the obtained property value obtained using the specified code.

In some embodiments according to the invention, a system for generating a common event format representation of information from a plurality of messages may include means for parsing a rule associated with a current message to determine if a property of a common event format representation for the current message is to be populated with a property value from a previous message, means for obtaining the property value from the previous message if the rule specifies to obtain the property value from the previous message, and means for populating the common event format representation for the current message with the obtained property value from the previous message.

In further embodiments, the system may include means for parsing the rule associated with the current message to determine if the property of the common event format representation for the current message is to be populated with a property value determined by specified code, means for obtaining the property value using the specified code if the rule specifies to obtain the property value using the specified code, and means for populating the common event format representation for the current message with the obtained property value obtained from the specified code.

In other embodiments, methods, systems, and computer program products for generating a common event format representation of information from a plurality of messages may include parsing a rule associated with a current message to identify regular expressions therein, parsing the rule to determine if a property of the common event format representation for the current message is to be populated with a property value determined by specified code, obtaining the property value using the specified code if the rule specifies to obtain the property value using the specified code, and populating the common event format representation for the current message with the obtained property value. Execution of the specified code may be based on execution of at least one of the identified regular expressions. In further embodiments, execution of at least one of the identified regular expressions may be based on execution of the specified code. In other embodiments, the rule may specify re-using a property value from a previous execution of the specified code or creating a new object to execute the specified code.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
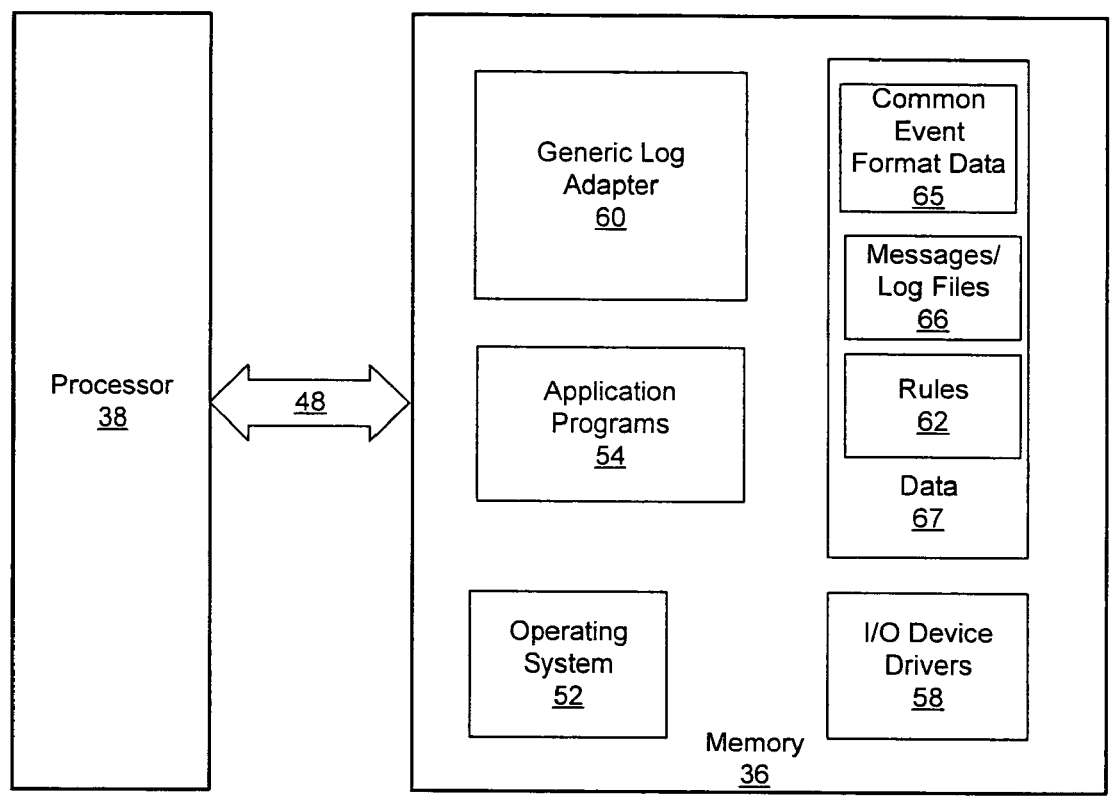
FIG. 2 is a more detailed block diagram of a data processing system for generating a common event format representation of information from a plurality of messages according to further embodiments of the present invention.

FIG. 2 is a block diagram of data processing systems that illustrate systems, methods, and computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System 390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30 and preferably include at least one application which supports operations for generating events having a common event format according to embodiments of the present invention. Finally, the data 67 represents the static and dynamic data used by the application programs 54, the operating system 52, the I/O device drivers 58, and other software programs that may reside in the memory 36.

As is further seen in FIG. 2, the memory 36 may include an adapter 60, such as a Generic Log Adapter. The adapter 60 may be a stand-alone application, or may provide an interface to be called from within one or more of the application programs 54. The adapter 60 may carry out operations described herein for generating a common event format representation of information from a plurality of messages. The adapter 60 may be configured to parse a rule associated with a current message to determine if a property of a common event format representation for the current message is to be populated with a property value from a previous message. If the rule so specifies, the adapter 60 may obtain the property value from the previous message and may populate the common event format representation for the current message with the obtained property value. In addition, the adapter 60 may be configured to parse the rule associated with the current message to determine if the property of the common event format representation for the current message is to be populated with a property value determined by specified code. If the rule so specifies, the adapter 60 may obtain the property value using the specified code, and may populate the common event format representation for the current message with the obtained property value.

The data portion 67 of memory 36, as shown in the embodiments illustrated in FIG. 2, may, optionally, include common event format data 65, messages/event logs 66, and/or rules 62.

The messages 66 may be analyzed by the adapter 60 using the rules 62 to provide the common event format data 65.

While the present invention is illustrated, for example, with reference to the adapter 60 as an application program in FIG. 2, as will be appreciated by those of skill in the art, other configurations may also be utilized while still benefitting from the teachings of the present invention. For example, the adapter 60 may also be incorporated into the operating system 52, the I/O device drivers 58 or other such logical division of the data processing system 30. Thus, the present invention should not be construed as limited to the configuration of FIG. 2 but is intended to encompass any configuration capable of carrying out the operations described herein. Embodiments of the present invention may take the form of an entirely hardware embodiment, an entirely software embodiment or an embodiment combining software and hardware aspects without departing from the teachings of the present invention.

Figure 3:
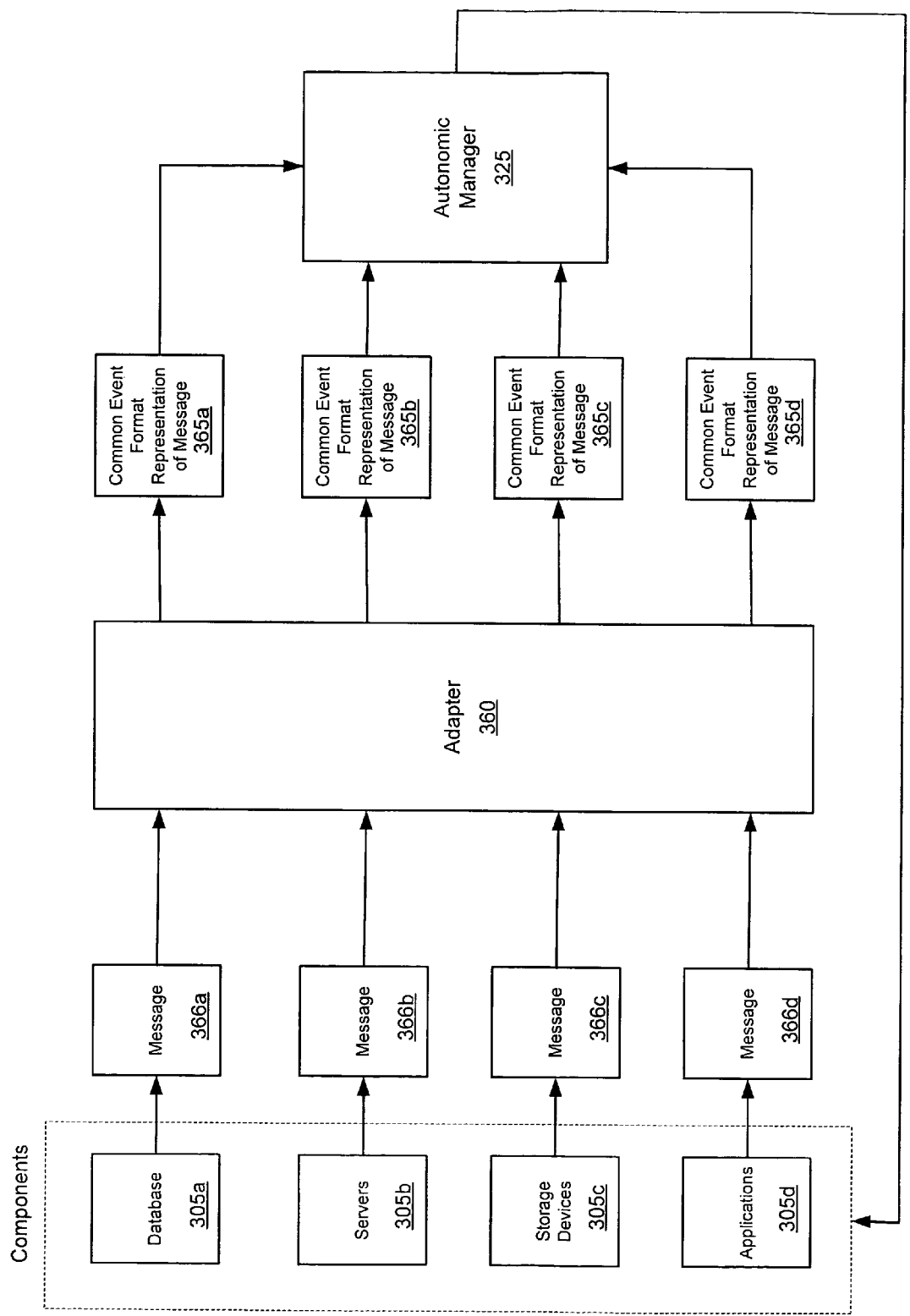
FIG. 3 is a block diagram of a system for generating a common event format representation of information from a plurality of messages according to some embodiments of the present invention.

FIG. 3 is a block diagram illustrating a system for generating a common event format representation of information from a plurality of messages according to some embodiments of the present invention. Referring to FIG. 3, an autonomic computing system 300 may include databases 305a, servers 305b, storage devices 305c, applications 305d, etc. Each of the components 305a-305d may generate respective messages/event logs 366a-366d. An adapter 360, such as a Generic Log Adapter, may then convert the messages 366a-366d into common event format representations 365a-365d, such as Common Base Event format representations, which can be understood by a management function 325, such as an autonomic manager. The adapter 360 converts the messages 366a-366d into a common format by populating the common event format representations 365a-365d with information from the messages. However, a single one of the messages 366a-366d may not contain all of the information required to generate the common event format representations 365a-365d.

According to some embodiments of the present invention, methods, systems, and computer program products for message/event decomposition provide directives which may aid the adapter in obtaining the missing information, and a composite key that may help to determine if messages may be related to previous messages that may contain related data. The directives may include implicit directives and explicit directives. Implicit directives (for example, #ADAPTER, as discussed below) have no parameters, and the adapter takes a predetermined action to assign a value to a field at runtime. Explicit directives may require parameters, and may further require an action (which may be a name of a Java class) that is interpreted and loaded by the adapter. Different variants of the explicit directives may support different object instantiation and method calling requirements. The resolution of the directive (which may involve object instantiation and/or method calls) may determine the value to be assigned to a field. An example of an explicit directive is #FILL_USING (com.ibm.acad.samplecode.Helper.resolveIP), as will be described in detail below.

In some embodiments, the use of directives may also provide mechanisms to associate Common Base Event-based constraints as close as possible to the producer. The associations may be recorded when the Common Base Events are created without the need for another entity to inspect the Common Base Events on a post-mortem basis and then associate them. Particular directives that provide such a function may include #USE_PREVIOUS and #USE_PREVIOUS_IMD, which are both implicit directives as described below. These directives may help the adapter to maintain state information during creation of the Common Base Events and to correlate events in their native formats while providing the ability to express the correlation itself through Common Base Event properties.

Figure 4:
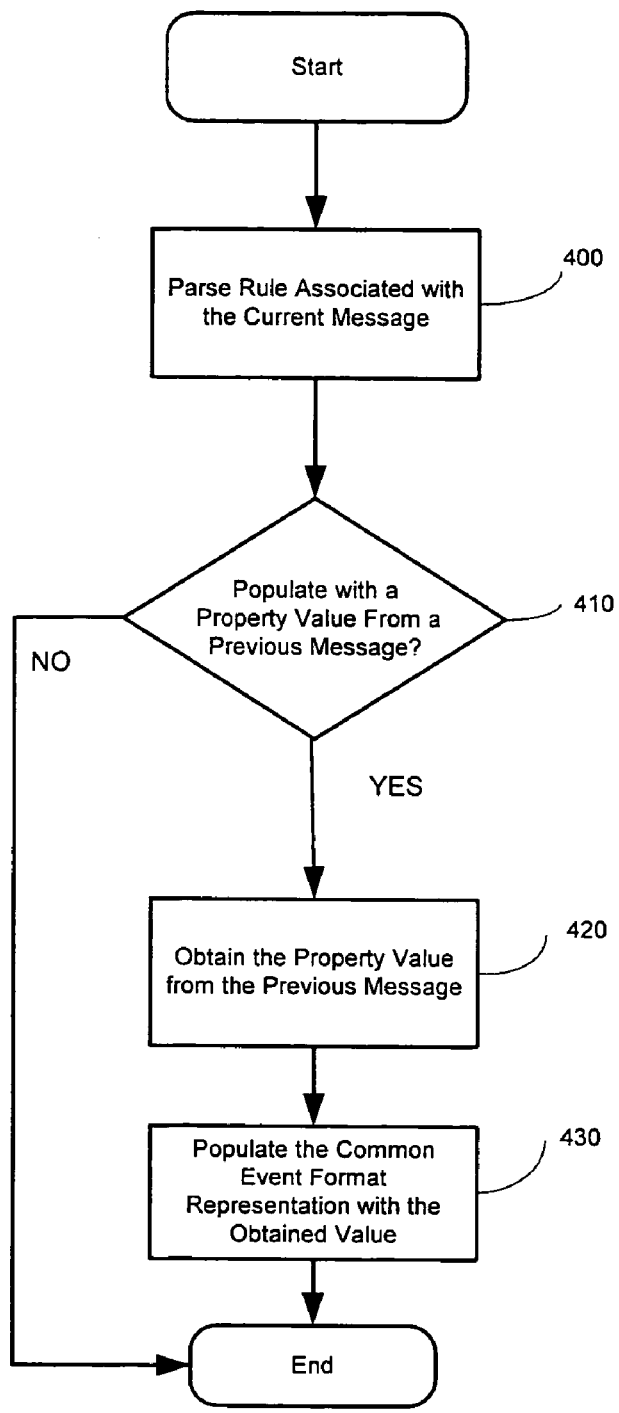
FIGS. 4 through 8 are flowcharts illustrating operations for generating a common event format representation of information from a plurality of messages according to some embodiments of the present invention.
Figure 5A:
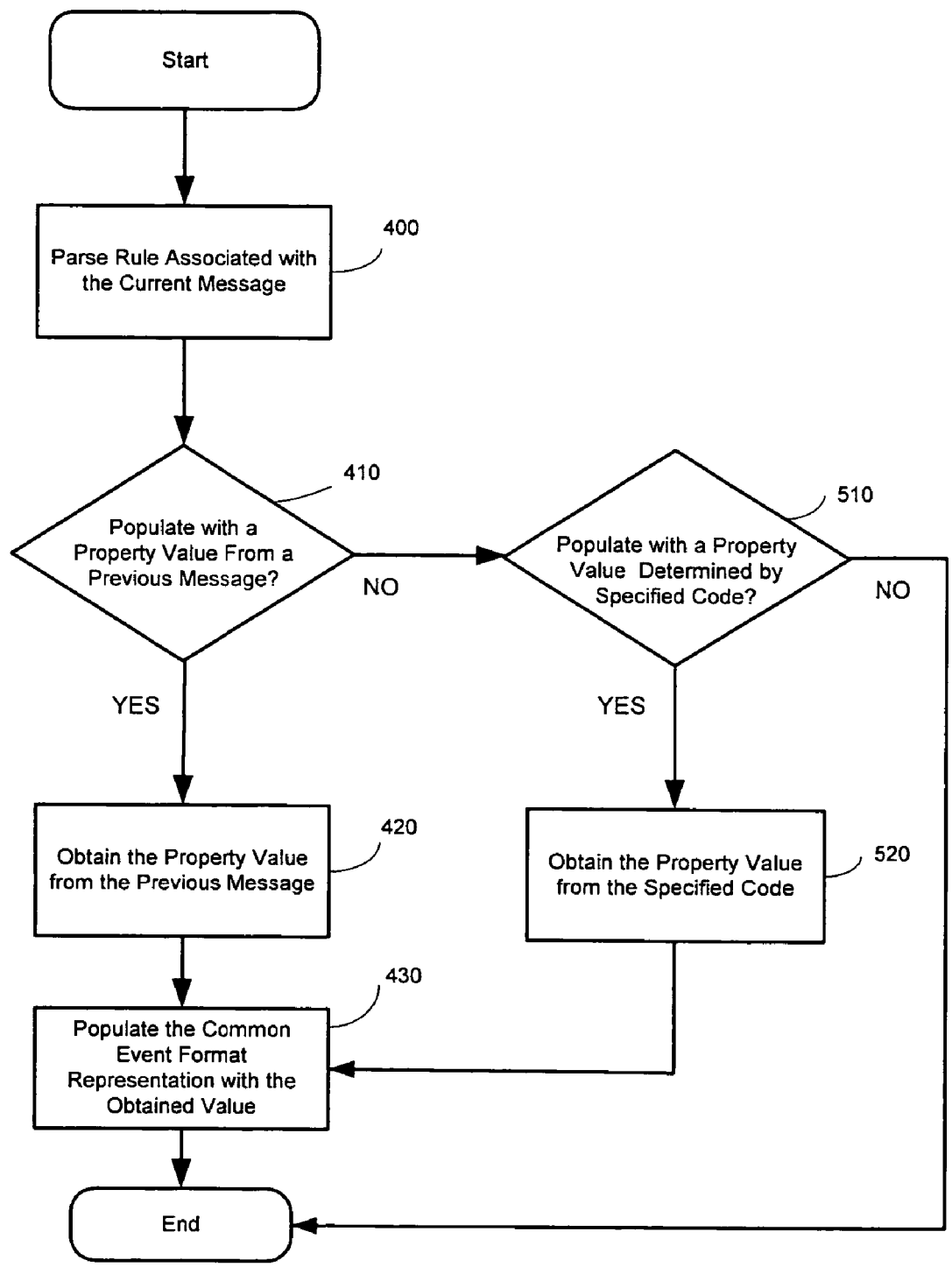
Figure 5B:
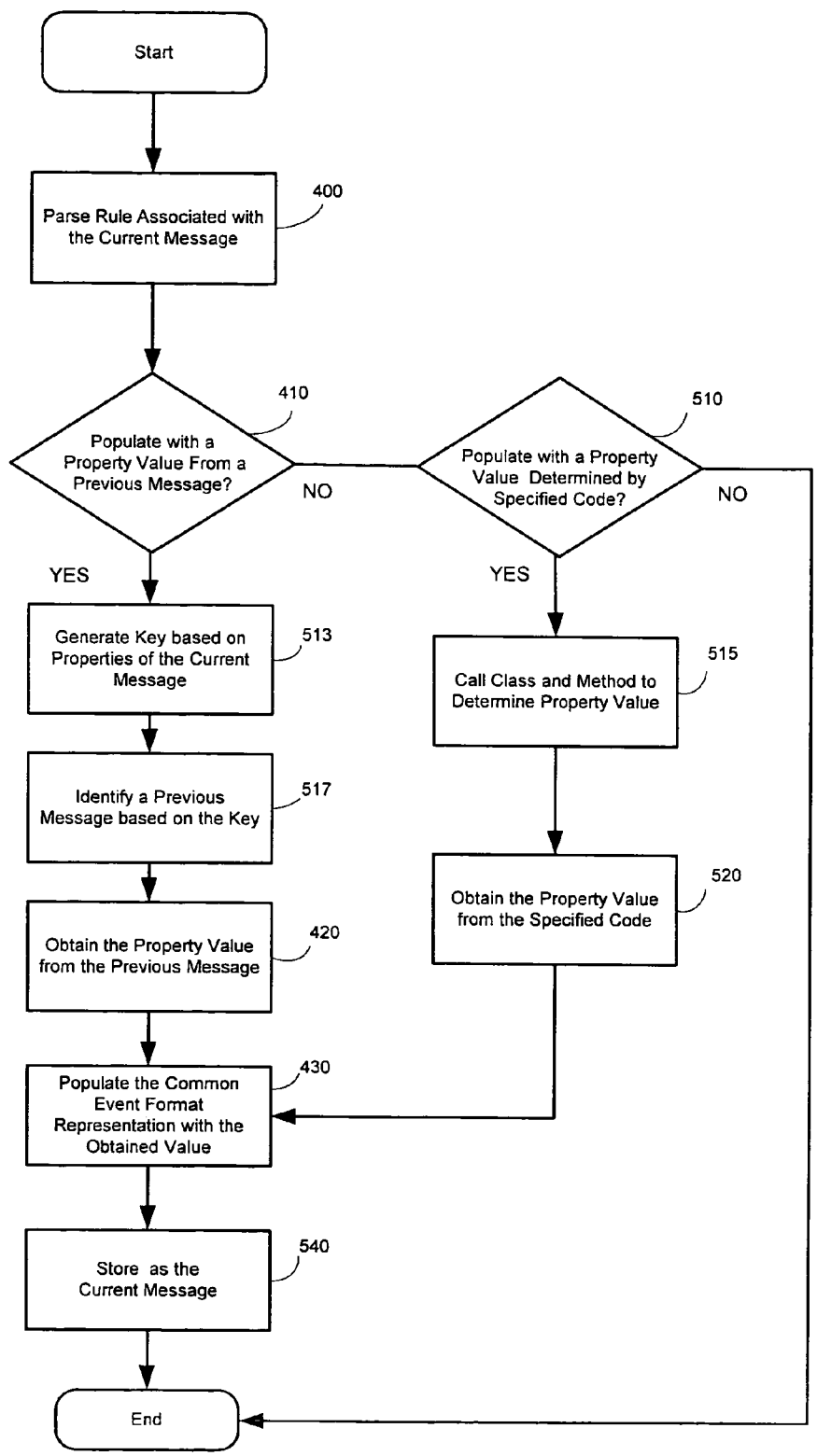
Figure 6:
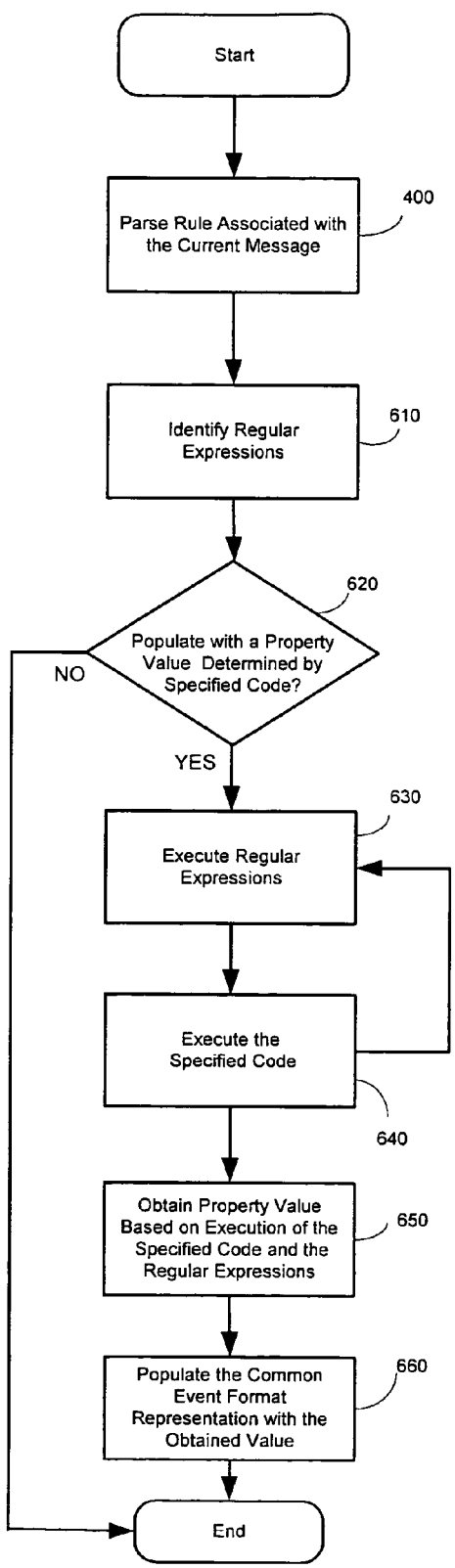

FIGS. 4-6 are flowcharts illustrating operations for generating a common event format representation of information from a plurality of messages according to some embodiments of the present invention. As shown in FIG. 4, operations begin (block 400) by parsing a rule associated with a current message. Parsing the rule may include looking for predefined directives that may be specified in the rule. The rule may be parsed by an adapter, such as the Generic Log Adapter. The parsing rules associated with particular messages/events may be stored in an application configuration file for the adapter. If a property of a common event format representation for the current message, such as a Common Base Event format representation, is to be populated with a property value from a previous message (block 410), the property value is obtained from the previous message (block 420). The common event format representation of the current message is then populated with the value obtained from the previous message (block 430). The determination of whether the common event format representation is to be populated with a property value from a previous message may be made by determining if the rule specifies that a value required for the common event format representation is to be obtained from a previous message. For example, an implicit directive, such as #USE_PREVIOUS, may be specified within the rule. Based on this directive, the adapter may determine the required property value using a corresponding value from the previous message. If the property of the common event format representation is not obtained from a previous message, for example if the rule does not specify to obtain the value from a previous message (block 410), alternate techniques of obtaining the value may be utilized, for example, as discussed below.

Further operations for generating a common event format representation of information from a plurality of messages according to some embodiments of the present invention are illustrated in FIG. 5A. Referring now to FIG. 5A, after parsing the rule (block 400), if the rule does not specify to obtain the property value from a previous message (block 410), it is determined if the property of the common event format representation for the current message is to be populated with a property value to be determined by specified code (block 510). In other words, it is determined if the rule specifies that a value required for the common event format representation is to be provided by specified code. The specified code may be designated by predefined directives provided within the rule. If the rule specifies to obtain the property value from the specified code (block 510), the property value is obtained using the specified code (block 520). For example, an explicit directive, such as #GENERATE_USING, may be specified by the rule. The adapter may interpret the explicit directive, and use the particular code specified by the directive to determine the property value. The specified code may perform the actual method or algorithm to determine the property value. The common event format representation of the current message is then populated with the obtained value (block 430). If the rule does not specify to obtain the value using specified code (block 510), alternate techniques of obtaining the value may be utilized. For example, the value may be obtained from the current message using conventional techniques.

Still further operations for generating a common event format representation of information from a plurality of messages according to some embodiments of the present invention are illustrated in FIG. 5B. As shown in FIG. 5B, after parsing the rule (block 400), if it is determined that a property of a common event format representation for the current message is to be populated with a property value from a previous message (block 410), a key is generated based on properties of the current message (block 513). The key may provide a unique way to associate the current message with a previous message. For example, the key may be generated by identifying properties in the current message that may be common to a previous message, and then combining the identified properties into a composite key. The key of the current message is then used to identify a previous message (block 517). In some embodiments, only a portion of the key may be generated if it is sufficient to identify a previous message. In such embodiments, the previous message may be identified based on a partial match with the portion of the key. The previous message may also be identified by comparing a key generated from properties of the previous message with the key for the current message. The property value is then obtained from the identified previous message (block 420) and the common event format representation is populated with the obtained value (block 430). The populated common event format representation may be stored as the current message (block 540).

Still referring to FIG. 5B, if it is determined that a property of the common event format representation for the current message is to be populated with a property value determined by specified code (block 510), a class and a specific method within the class specified in the parsed rule is called to determine the property value (block 515). In some embodiments, the specified code may re-use a property value from a previous execution of the specified code if the same class, method, and parameters as the previous execution are specified. Also, in some embodiments, the specified code may create a new object to call the method, and may store the new object along with the corresponding called class, method, and parameters. Thus, the specified code may instantiate a new instance of the class, or may use a previously instantiated instance. The property value is then obtained from the specified code (block 520), the common event format representation is populated with the obtained value (block 430), and the populated common event format representation may be stored as the current message (block 540).

Other operations for generating a common event format representation of information from a plurality of messages according to some embodiments of the present invention are illustrated in FIG. 6. Referring now to FIG. 6, after parsing the rule (block 400), any regular expressions contained within the rule are identified (block 610). Regular expressions may include formulas for matching strings in a message that follow some pattern. It is then determined whether a property of the common event format representation for the current message is to be populated with a property value determined by specified code (block 620). If so, some or all of the identified regular expressions are executed (block 630). The results of the execution of some of the regular expressions may then be used to execute the specified code (block 640). For example, the results of the execution of some of the regular expressions may be supplied as parameters for the specified code. As a result, execution of the specified code may be directly based on execution of one or more of the identified regular expressions. Similarly, the results of the execution of the specified code may be used to evaluate other identified regular expressions (block 630). As such, regular expressions and specified code may be combined together within the same rule/execution context. In other words, the regular expressions and the code specified by the rule may be interleaved. This may extend the syntax of a rule based on regular expressions by using a declarative that allows additional code (other than the regular expressions) to be embedded within a rule. A property value for the common event format representation is then obtained based on the execution of the specified code and the regular expressions (block 650), and the common event format representation is populated with the obtained value (block 660). The execution of the specified code may also be optimized, such as by re-using a property value from a previous execution of the specified code, creating a new object to call a method, etc., as described above with reference to FIG. 5B.

Additional discussion of embodiments of the invention according to FIGS. 4-6 will be now be provided. In particular, in some embodiments, the parsing rules may commonly have Substitute, Match and Position fields. All directives may be issued by filling the Substitute field within a rule for the particular property. The Match and Position fields may be empty, or may contain regular expressions to match and extract some portion of the input message which may be used as a parameter for the directive (typically supported by the explicit directives). The rule containing the directive may be used with other normal rules containing regular expressions. The directive-containing rule may be specifically used for a particular property, or may be used as a catch-all rule at the end of a set of rules for the particular property. Directives may also be coded as strings in the Substitute field of a rule for a property using a rule builder. When using a rule builder, the directive may be typed in the Substitute field when editing/adding a rule for a Common Base Event property. The directives may be evaluated by a Message Converter provided as part of the adapter package, or by another converter or formatter which may support these directives. The set of directives explained herein are provided for exemplary purposes only and, therefore, embodiments of the present invention should not be limited to embodiments illustrated therein.

ADAPTER

Implicit directives, such as #ADAPTER, do not require any parameters. Based on an implicit directive, an adapter, such as the Generic Log Adapter, can determine what action to take to determine a value for a property. As such, the #ADAPTER directive may be used for different CBE properties, and the adapter can determine what to do for each particular property. The #ADAPTER directive may not require any additional configuration of the converter. The #ADAPTER directive can be used for specific properties, such as those listed below:

| CBE Property | Function of the #ADAPTER directive |
| --- | --- |
| LocalInstanceId | Adds the current timestamp and hash code of the converter object thereby providing a unique ID within that stream of messages (context) flowing through the adapter. |
| GlobalInstanceId | Uses a GUID routine to determine the global instance ID across all contexts and adapter instances across the network (truly global ID of 45 hexadecimal characters). |
| Location (Source Component ID) | Inserts the IPv4 address of the machine where the adapter is running. If IP cannot be determined, inserts a blank. |
| LocationType (Source Component ID) | If the location field is filled with IPv4 address then inserts the string IPv4 as the value for this field. Else inserts UNKNOWN. |
| All fields of Reporter Component ID | Inserts information about the Adapter that I sreporting the events; some predefined values for some fields (application, component, sub-component etc.) and some dynamicly calculated values for other fields (location, locationtype etc. as above). |

USE_PREVIOUS

USE_PREVIOUS is a pseudo-implicit directive. In other words, during runtime, this directive may be provided as part of the rule set without any parameters, but its resolution may involve some knowledge provided by the application configuration file. This directive may be interpreted based on the Memory configuration provided to the CBE Message Converter as part of the application configuration file. This directive can be used to direct the adapter converter to provide the value for a CBE property based on values for the same property in a previously encountered message, to which the current message may be related in some way. The relationship may be expressed in terms of a composite key used for comparison. The composite key may be computed from a number of CBE properties, which may be used to determine which messages are to be related to one another. This may be useful for certain log messages which have primary and secondary messages, where the secondary messages may not necessarily occur immediately after the primary messages (for example, some of the DB2 messages in the DB2DIAG.log). The secondary messages typically provide additional information that may be represented as a new CBE message, but may not contain all of the information necessary to generate a valid CBE message. This missing information may be available in the corresponding primary message, and as such, the primary message may need to be retained. If no keys (CBE properties) are provided as part of the application configuration file, a composite key cannot be determined for relating primary and secondary messages. In such cases, it may be assumed that the primary and secondary messages follow each other immediately. Accordingly, when the #USE_PREVIOUS directive is encountered in such cases, the immediately preceding message (which has already been processed) may be used to obtain the value for the particular property to populate the current CBE message.

The #USE_PREVIOUS directive may be placed as a string in the Substitute field of a rule for a particular property. The only exception may be for the creationTime field, in which case a value of −1 can be used as the directive instead of the #USE_PREVIOUS string. This is because the creationTime field may hold only numbers as legal values. Typically, the rule containing the #USE_PREVIOUS directive may not occur as the only rule for a particular property, because the same property must be filled with an actual value deduced from the primary message; thus, a rule may be needed to extract that value from the primary message. Usually, a rule containing the #USE_PREVIOUS directive in the Substitute field may follow a regular rule for the same property, but may be intended for extracting values from the primary message and thereby for processing the primary message.

If a corresponding primary message cannot be found, the #USE_PREVIOUS directive may resolve to an empty string. Note that the values extracted from the primary message may have directives themselves (such as #ADAPTER, for example). In other words, the result of resolving the #USE_PREVIOUS directive may provide another directive as a value, which may then be evaluated again to determine the final value, but within the context of the secondary message. This may be important when the directive can take parameters. The parameters may be taken from the secondary message even though the directive taking parameters was issued for primary messages. Typically, a rule containing the #USE_PREVIOUS directive in the Substitute field will have empty Match and Positions fields, but when it is known that the #USE_PREVIOUS directive may resolve to another directive, then Match and Position values may be provided to extract one or more portions of the secondary message to provide as parameters to the directive which may be the value as a result of evaluating the #USE_PREVIOUS directive. This may be a safe approach, as the set of directives to be resolved for any message can be #USE_PREVIOUS directives.

As mentioned above, the #USE_PREVIOUS directive may not be the only rule for a property, because in order to provide a value for the property when evaluating #USE_PREVIOUS, a previously detected value must be available. This may be possible only if an actual rule existed to extract the appropriate value from the primary message. Also, this directive may not be the first rule in the set of rules for a property for the same reason. An example illustrating the use of the #USE_PREVIOUS directive is provided by Exemplary Rule Set #1 attached below.

The set of properties that determine the key for associating primary and secondary messages may need to be carefully decided. As the key may provide a unique way to associate messages, a property that is unique among all the messages (such as creation time/timestamp) may be a bad choice to be a key (either by itself or as part of a composite key) because it may not help to associate messages, and also may increase the number of states the adapter may need to maintain. The adapter may maintain the last message seen for each unique composite key, hence the choice of composite key may be particularly important. Also, once the secondary message has been processed successfully, the secondary message may become the message associated with the key. As such, future secondary messages may borrow values from this processed secondary message. This may be safe in many cases because the processed secondary message has the required fields, as borrowed from the actual primary message.

In the case of DB2, the primary and secondary messages may be related based on process ID and thread ID. Consequently, the memory keys can be sourceComponentId.processId and sourceComponentId.threadId. The values of these two fields may be concatenated to produce the composite key, which may be used to correlate the primary and secondary messages. Note that these values are CBE properties, and the rules to determine these values (i.e. the rules for these two properties in the rule set) may not contain a rule that has the #USE_PREVIOUS directive. However, other properties in the rule set may have rules that contain the #USE_PREVIOUS directive. For example, the creationTime property may have a set of rules, where a first rule may determine how the time stamp can be extracted from the primary message, and where a second rule may have a Substitute value of −1 (which may be equivalent to #USE_PREVIOUS for this property). Accordingly, #USE_PREVIOUS may be used for secondary messages that do not have time stamps, because in order to create the corresponding CBE property for the secondary message, the time stamp from the primary message may be used.

USE_PREVIOUS_IMD

USE_PREVIOUS_IMD is an implicit directive; it is a variant of the #USE_PREVIOUS directive. The #USE_PREVIOUS_IMD directive is similar to the #USE_PREVIOUS directive; however, #USE_PREVIOUS_IMD may obtain values from an immediately preceding message to populate the fields of a common event format representation (such as the Common Base Event format) for the current message for the properties which specify this directive in the associated rule. The use of the immediately preceding message may be accomplished using the #USE_PREVIOUS directive itself, by providing an empty configuration (i.e. by not providing any MemoryKey elements as part of the Memory configuration). However, such action may affect the entire log file. In order to use the immediately preceding message for certain fields/properties but use a correlated message (which may not be the immediately preceding message) for other fields/properties, the #USE_PREVIOUS and #USE_PREVIOUS_IMD directives can be used in conjunction with each other. The Memory configuration section may be used to specify the correlation constraints, and the #USE_PREVIOUS directive may be used to populate fields using values from the corresponding message based on the constraints. For other fields which may need to be populated with values from the immediately preceding message, the #USE_PREVIOUS_IMD directive may be used. For example, in DB2 (where the secondary and primary messages may not always be consecutive), data may be obtained from the corresponding primary message. However, the timestamp may be taken from the immediately preceding message (even if it is not a related message), so as not to disturb the temporal ordering of events. Thus, in this example, #USE_PREVIOUS_IMD may be used for the timestamp field, while #USE_PREVIOUS may be used for all other fields.

Both of the above directives associate one message with another. Since the primary message (from which data may have been extracted) may already have been transformed into Common Base Event format, it may not be possible to change the AssociatedEvents field of that message. However, in the related message currently under consideration (i.e. the secondary message), the entire primary message may be available, a part of which (typically the GlobalInstanceId) may be used to populate the AssociatedEvents field of the current message. It may not be feasible to hold the primary message for further population of the AssociatedEvents field, because when that message is created, it may not be known if a related message would ever arrive as part of the remaining log file/event stream.

GENERATE_USING and #FILL_USING

Explicit directives may be used when the implicit directives are not sufficient to provide the value of a property required to populate a common event format representation of a current message. In some embodiments, the explicit directives may only be interpreted by a converter component of the adapter. The actual action to determine the value may be taken by the specified supporting/helper code that is specified by the explicit directive. The explicit directives may provide a common syntax to provide supporting/helper code to the adapter to perform tasks that are actually implemented by supporting code. Explicit directives may be used as a mechanism to further customize the converter by plugging in additional functionality in a declarative fashion. In other words, no additional change in the parsing rules or interface implementation may be required to plug in the supporting/helper code into the adapter framework.

Both the #GENERATE_USING and #FILL_USING directives may instruct the adapter to call a class and a particular method in that class with or without any parameters. The parameters may be hard-coded as part of the directive or may be extracted from the input message using regular expressions in the Match field supported by values in the Positions field. In other words, the results of normal parsing may be used as parameters for the directives to perform some action, custom formatting (such as trimming out spaces or other characters) etc.

A difference between the two directives is that the #GENERATE_USING directive may instruct the adapter converter to call the specified method every time the directive is encountered. In contrast, the #FILL_USING directive may instruct the adapter converter to call the specified method the first time the directive is encountered for that particular context of adapter operation, and reuses the same value each time the directive is encountered within the same context. When the #FILL_USING directive is specified, the adapter may save the value resulting from calling the specified method along with a key that consists of the class name, the method name and the actual parameters (as opposed to just the method signature). If the parameters change, the key may change as well, such that when #FILL_USING is encountered again (with the same class and method name but with different parameters which have not been encountered before), the currently stored value may not be used, because it was stored as the result of calling the method of that class with some other parameters (which do not match the current set of parameters). In general, if when evaluating the #FILL_USING directive, a stored value corresponding to the same class name, method name, and actual parameters is not encountered, the method may be called with the current parameters to determine the value for that property, and the result of the call will be stored against a key that includes the class name, method name, and current set of parameters.

For example, the #GENERATE_USING directive may include the following syntax:
GENERATE_USING([#NEW :]<classname>, <methodname>) Alternatively, the #GENERATE_USING directive may include:
GENERATE_USING({#NEW :]<classname>,<methodname>,<param1>, <param2 . . . )

Likewise, the #FILL_USING directive may include the following syntax:
FILL_USING([#NEW :]<classname>, <methodname>) Alternatively, the #FILL_USING directive may include:
FILL_USING([#NEW :]<classname>, <methodname>, <param1>, <param2> . . . )

In some embodiments, the class name and method name may not be enclosed within any single or double quotes. The class name may be fully qualified using Java syntax conventions. The parameters may match the type and order as per the method signature for the specified method. Parameters may be enclosed in double quotes if they contain commas (,). If double quotes are used to enclose the parameters, they may be escaped by using escape character (\), because the entire directive may need to be placed as a single string within the substitute field and may be represented internally as a Java string. The individual parameters may be separated by commas.

∩NEW is an inner directive that can be used within the above two directives according to some embodiments of the present invention. The #NEW directive can be used within the #GENERATE_USING or #FILL_USING directives to force creation of a new object of the specified class before the method is called on that object. If the #NEW keyword is omitted, the same object may be used whenever the specified method is called. This object may be created when any directive containing the specified class name is first encountered. From then on, the same object may be used whenever the particular class is specified within any directive, even one of a different kind. For example, if the first directive encountered by the adapter is a #GENERATE_USING directive specifying a particular class, an object of that class may be created and used to resolve that directive. If the next directive encountered by the adapter is a #FILL_USING directive specifying the same class, the same object will be used, irrespective of whether the same or different method is being called.

To override this default behavior, the #NEW directive may be used within the #GENERATE_USING or #FILL_USING directives immediately before the class name (without any intermediate spaces). When the converter encounters a #NEW within these directives, it may create an object of the specified class name and use it to call the method. It may also save the object against the class name for future use, i.e. when a directive containing the same class name but without the #NEW in front of it is encountered.

In some embodiments according to the present invention, the use of the #NEW directive may involve some subtle issues. For example, if a number of rules for different properties have #NEW in front of the class name, a new object may be created each time such a rule is evaluated. Thus, during the course of creation of one CBE format representation of a current message, #NEW may be encountered multiple times, and hence new objects may be created multiple times. This may or may not affect the result, depending on what is done in the constructor of the classes used for evaluation of the directives. Since the order of evaluation of the properties (i.e. which property's rules are evaluated first) may not be fixed, caution may be necessary when #NEW is used together with classes that do a considerable amount of work within the constructor when other methods in the class that produce actual results are called.

Also, it should be noted that the other directives may not be appropriate for the creationTime field with the exceptions of the #USE_PREVIOUS directive (where the number −2 may be used to represent the directive) and the #USE_PREVIOUS_IMD directive (where the number −1 may be used to represent the directive).

In some embodiments, there may be certain rules as to how the classes being used with these directives can be written. In particular, the class may have a default constructor. The adapter may try to instantiate an object of the class using the default constructor. In addition, the methods being called using the directives may return String values. If they return other objects, the adapter may call the toString( ) method. They may not return primitive data types, as this may cause the evaluation of the directive to fail. Also, the classes may be made available in the class path of the adapter, either as classes or as a Java application resource (.jar) file where the class path may be added manually to the system class path before calling the adapter. As a further alternative, the classes may be made available in the class path as a .jar file created with the class and its supporting classes together with other jar files required by this class in the jars4Custom folder within the adapter installation. All .jar files in this folder may be loaded by the adapter upon start-up.

If a #GENERATE_USING or #FILL_USING directive cannot be evaluated successfully—i.e. a class could not be loaded, a method is not present, exceptions occur, etc.—the output may remain the directive, as an indication that the directive may have failed. When monitoring the output of the adapter, if the directive strings are observed, then it may indicate that some administrative actions need to be taken. However, the configuration may provide that unresolved directives may be replaced and also what the replacement would be. The replacement may be a value that may be appropriate as a default for all fields for messages in that log file, or it may be a specific/localized string indicating a problem.

Some exemplary rules and the corresponding output are provided below to illustrate the operation of these directives:

```
.
.
.
<com.ibm.acad.parser:RuleAttLocation>
    <com.ibm.acad.parser:Subs
        Match="(\w+)\.(\w+)\.(\w+)\.(\w+)" Name="Whatever is in position 3"
        Substitute="#FILL_USING(com.ibm.acad.samplecode.Helper,resolveIp,$1,$2,$3 ,$4)"
        Positions="3" Value="howard"/>
</com.ibm.acad.parser:RuleAttLocation>
.
.
.
<com.ibm.acad.parser:GroupsExtendedDataElement>
    .
    .
    .
    <com.ibm.acad.parser:RuleAttName>
        <com.ibm.acad.parser:Subs Name="Sample1" Substitute="Sample1" Value="Sample1"/>
    </com.ibm.acad.parser:RuleAttName>
    <com.ibm.acad.parser:RuleAttExDataValues>
        <com.ibm.acad.parser:Subs
            Match="(.*)" Name="Demonstrate use of #NEW with FILL_USING"
            Substitute="#FILL_USING(#NEW:com.ibm.acad.samplecode.Helper,resolveIp,$1)"
            Positions="3" Value="howard"/>
    </com.ibm.acad.parser:RuleAttExDataValues>
</com.ibm.acad.parser:GroupsExtendedDataElement>
<com.ibm.acad.parser:GroupsExtendedDataElement>
    .
    .
    .
    <com.ibm.acad.parser:RuleAttName>
        <com.ibm.acad.parser:Subs Name="Sample2" Substitute="Sample2" Value="Sample2"/>
    </com.ibm.acad.parser:RuleAttName>
    <com.ibm.acad.parser:RuleAttExDataValues>
        <com.ibm.acad.parser:Subs
            Match=" " Name="Demonstrate use of #NEW with GENERATE_USING"
            Substitute="#GENERATE_USING(#NEW:com.ibm.acad.samplecode.Helper,dummyCall)"
        />
    </com.ibm.acad.parser:RuleAttExDataValues>
```

-continued

```
</com.ibm.acad.parser:GroupsExtendedDataElement>
.
.
.
<com.ibm.acad.parser:RuleAttGlobalInstanceId Description=" " Name="globalInstanceId">
    <com.ibm.acad.parser:Subs Match=" " Name=" " Positions=" "
    Substitute="#GENERATE_USING(com.ibm.acad.samplecode.Helper,
generateGlobalInstanceId)"
    />
</com.ibm.acad.parser:RuleAttGlobalInstanceId>
.
.
.
```

The following is a sample output produced by the above rule set for a sample input file:

```
<CommonBaseEvent
creationTime="2003-09-17T16:27:23.000000-05:00"...
    <extendedDataElements name="Sample2" type="string">
        <values>Object #0 Result of dummy call</values>
    </extendedDataElements>
    <extendedDataElements name="Sample1" type="string">
        <values>Object #1 9.42.140.148</values>
    </extendedDataElements>
    <sourceComponentId ... location="Object #0 9.42.140.148"...
</CommonBaseEvent>
<CommonBaseEvent
creationTime="2003-09-17T16:33:19.000000-05:00"...
    <extendedDataElements name="Sample2" type="string">
        <values>Object #2 Result of dummy call</values>
    </extendedDataElements>
    <extendedDataElements name="Sample1" type="string">
        <values>Object #3 9.42.140.125</values>
    </extendedDataElements>
    <sourceComponentId ... location="Object #2 9.42.140.125"...
</CommonBaseEvent>
<CommonBaseEvent
creationTime="2003-09-17T16:33:21.000000-05:00"...
    <extendedDataElements name="Sample2" type="string">
        <values>Object #4 Result of dummy call</values>
    </extendedDataElements>
    <extendedDataElements name="Sample1" type="string">
        <values>Object #1 9.42.140.148</values>
    </extendedDataElements>
    <sourceComponentId ... location="Object #0 9.42.140.148"...
</CommonBaseEvent>
<CommonBaseEvent
creationTime="2003-09-17T16:33:25.000000-05:00"...
    <extendedDataElements name="Sample2" type="string">
        <values>Object #5 Result of dummy call</values>
    </extendedDataElements>
    <extendedDataElements name="Sample1" type="string">
        <values>Object #1 9.42.140.148</values>
    </extendedDataElements>
    <sourceComponentId ... location="Object #0 9.42.140.148"...
</CommonBaseEvent>
<CommonBaseEvent
creationTime="2003-09-17T16:33:29.000000-05:00"...
    <extendedDataElements name="Sample2" type="string">
        <values>Object #6 Result of dummy call</values>
    </extendedDataElements>
    <extendedDataElements name="Sample1" type="string">
        <values>Object #3 9.42.140.125</values>
    </extendedDataElements>
    <sourceComponentId ... location="Object #2 9.42.140.125"...
</CommonBaseEvent>
```

The output illustrated above and its method of generation will now be discussed. For the above output, the sample Helper class has a constructor that initializes an instance string containing a number that is obtained from a static variable. Each time an object of the helper class is created, the number is incremented. The string created in the constructor is added to the value returned by all methods of the class. The input file has 5 messages. When the first message is processed, the first directive to be encountered is for the extended data element named Sample2. Since this directive is a #GENERATE_USING directive with a #NEW inner directive, a new object is created and the method call is performed to determine the result. The next directive is the #FILL_USING directive for the location property. Note that there is no #NEW in this directive. Consequently, the same object is used; hence the Object #0 in the result for both these properties. The directive for this property uses the hostname from the input message to determine the IP address. Since the IP addresses of host names are assumed to be constant during execution of the adapter, the #FILL_USING directive is used instead of the #GENERATE_USING directive. Since this is the first time this hostname is encountered (this is the first message), the method call is made to determine the IP address. Note that the order of processing does not relate to the order of occurrence in the resultant CBE. However, the order does not change during processing of the entire input file. The next directive to be encountered is the #FILL_USING directive for extended data element named Sample1. This directive also contains a #NEW inner directive, and hence a new object is created before the method is called—hence the Object #1 in the result.

Still referring to the above output, when the next message is processed, the first directive encountered for that message is the one for the Sample2 extended data element. This directive contains a #NEW directive, and a new object is created. Note that two objects have already been created and this is the third one, hence the occurrence of Object #2 in the result for this property. Even though #FILL_USING has been used for this property, the hostname is different from the previous message, and this is the first time this hostname has been encountered (this is only the second message). Hence the method call is made to determine the IP address. The next directive would be the one for the location property which does not contain the #NEW directive, and hence uses the same object as reflected in the resultant value. Finally, the #GENERATE_USING directive for the Sample1 extended data element is evaluated, and since it contains the #NEW directive, a new object is created—hence the Object #3 in the resultant value.

An additional point to note with reference to the above output is how the directive for the location property and the Sample1 extended data element property are evaluated for the third message. The third message has the same hostname as the first message. Hence the combination of class name, method name, and parameters (hostname) are the same as for the first message. As such, instead of calling the method, the adapter fills the value of location property for the third message with the value saved when processing the first message, when the method call was actually made. The same applies to the Sample1 extended data element value—even though it contains a #NEW in front of the class name, the combination of class name (with #NEW), method name, and parameters (hostname) match that of the first message. Note that two separate values have been stored—one for the combination of class name, method name, and parameters (host name) with the #NEW in the class name, and one without the #NEW in the class name, even though the parameters were the same.

A comprehensive example of the use of the #GENERATE_USING and #FILL_USING directives, with and without the #NEW inner directives, is provided by Exemplary Rule Set #2 attached below.

Figure 7:
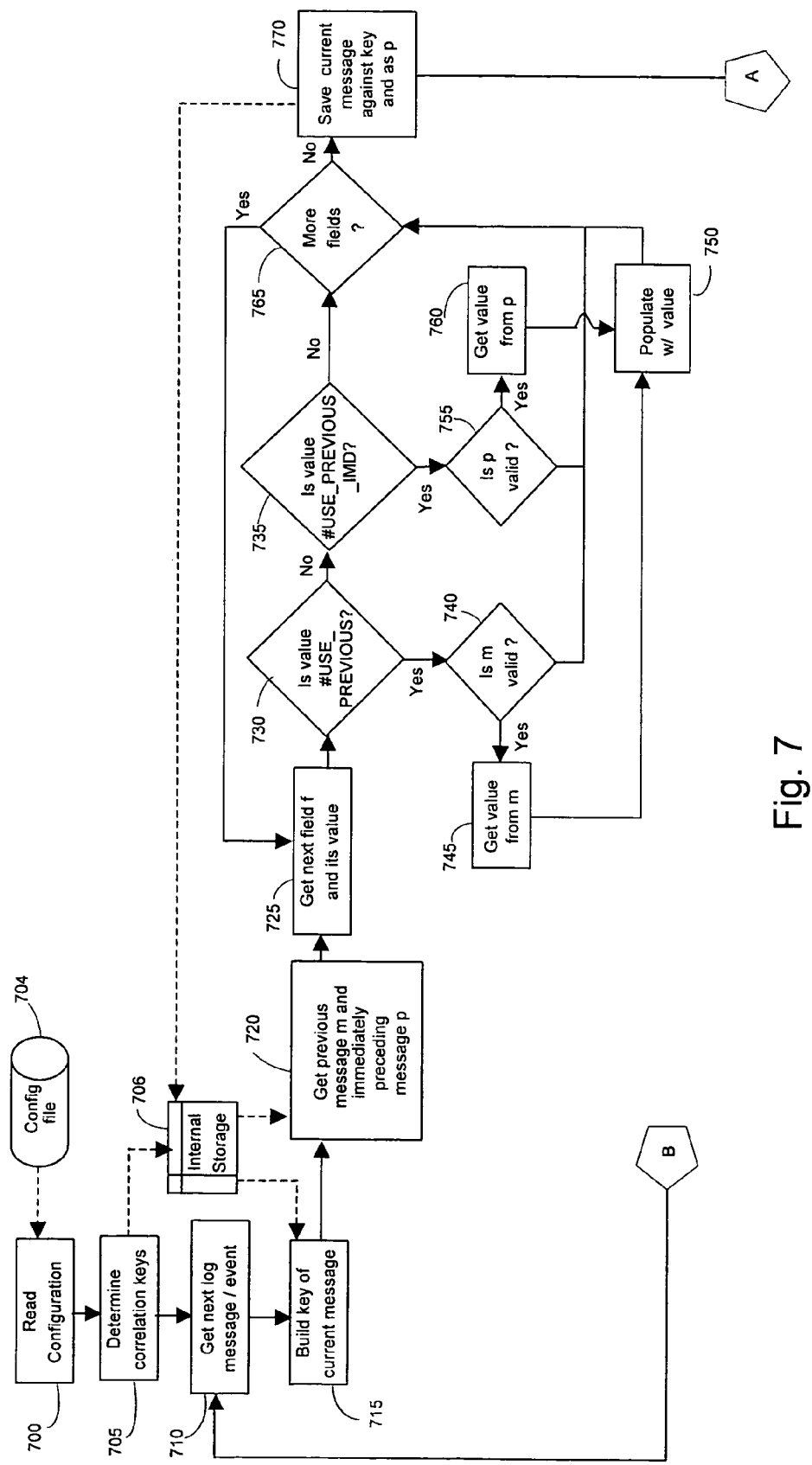

FIG. 7 is a flowchart illustrating operations for generating a common event format representation of information from a plurality of messages using the exemplary implicit directives described above according to various embodiments of the invention. As shown in FIG. 7, operations begin when an adapter, such as the Generic Log Adapter, reads an application configuration file 704 (block 700). The application configuration file 704 may contain the parsing rules associated with particular messages/events, as well sets of properties, such as CBE properties, which may be used as correlation keys to associate current messages with previous messages. The correlation keys are determined from the properties stored in the application configuration file (block 705), and may be stored in an internal knowledge base 706 for the adapter. The adapter retrieves the next message/event (i.e. the current message) (block 710), and generates a composite key for the current message (block 715). The composite key may be generated based on the correlation keys from the internal knowledge base. More particularly, the adapter may identify properties in the current message that may be common to a previous message, and may combine the identified properties to generate the composite key. The adapter may identify a previous message that is related to the current message based on the composite key. In some embodiments, the adapter may be able to identify a previous message based on an incomplete key. In other words, the adapter may generate only a portion of the composite key if it is sufficient to identify a closely matching previous message.

Still referring to FIG. 7, the adapter retrieves the identified previous message and a message that immediately precedes the current message (block 720). The previous message and the immediately preceding message may be retrieved from the internal knowledge base 706. The next field of the parsing rule for the current message and its value are then retrieved (block 725). The adapter determines whether the value specified by the rule is #USE_PREVIOUS (block 730), or alternatively, whether the value specified by the rule is #USE_PREVIOUS_IMD (block 735). If the value specified by the rule is #USE_PREVIOUS, the adapter determines whether the identified previous message is valid (block 740). In other words, the adapter determines if the identified previous message actually contains a valid value with which to populate the common format representation of the current message. If so, the value of the property from the previous message is retrieved (block 745) and used to populate the common format representation of the current message (block 750).

Similarly, if the value specified by the rule is #USE_PREVIOUS_IMD (block 735), the adapter determines whether the immediately preceding message is valid (block 755), and if so, retrieves the value of the property from the immediately preceding message (block 760) and uses the value to populate the common format representation of the current message (block 750). As such, the populated common event format representation may be stored as the current message. The adapter determines if there are any further fields for the rule that specify the values #USE_PREVIOUS or #USE_PREVIOUS_IMD (block 765). If so, the next field of the rule for the current message and its value are retrieved (block 725), and the process is repeated. If there are no further fields that specify #USE_PREVIOUS or #USE_PREVIOUS_IMD, the current message is saved against the composite key, and is also saved as the immediately preceding message (block 770). The current message may be stored in the internal knowledge base 706. The process is then continued in FIG. 8.

Figure 8:
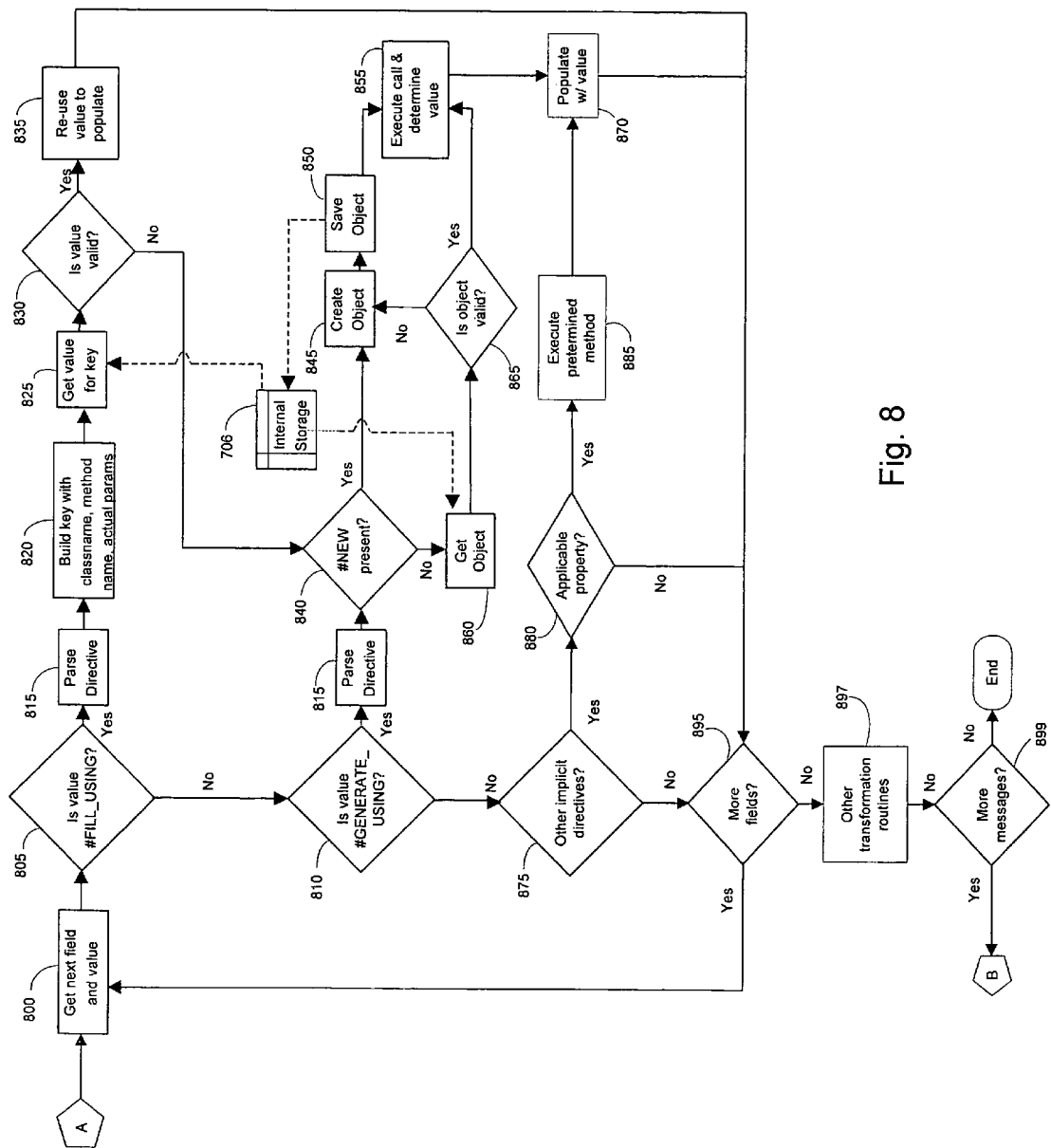

FIG. 8 is a flowchart illustrating operations for generating a common event format representation of information from a plurality of messages using the exemplary explicit directives described above according to various embodiments of the invention. Referring now to FIG. 8, the next field of the parsing rule for the current message and its value are retrieved (block 800). The adapter determines whether the value specified by the rule is #FILL_USING (block 805), or alternatively, whether the value specified by the rule is #GENERATE_USING (block 810). If the value specified by the rule is #FILL_USING, the adapter parses the directive (block 815) and generates a key that consists of the class name, method name, and the actual parameters specified by the #FILL_USING directive (block 820). The adapter retrieves a stored property value (corresponding to a previous execution of the #FILL_USING directive) (block 825). The stored value may be retrieved from the internal knowledge base 706. The adapter determines whether the class name, method name, and the actual parameters associated with the stored value match the class name, method name, and the actual parameters associated with the current execution (block 830). To make this determination, the adapter may compare a key associated with the stored value with the key generated for the current execution (block 820). If the stored value is valid for the current execution (i.e. the class name, method name, and the actual parameters match), the adapter re-uses the stored property value to populate the common event format representation for the current message (block 835), and determines if there are any further fields for the rule (block 895).

However, if the stored value is not valid (block 830), the adapter determines whether the inner directive #NEW is present in the #FILL_USING directive (block 840). If so, the adapter creates a new object (block 845), saves the object against the class name (block 850), and uses the created object to call the method specified by the #FILL_USING directive to determine the property value (block 855). The created object may be stored in the internal knowledge base 706 for future use, such as when a directive containing the same class name (but without the #NEW directive) is encountered. If the #NEW directive is not present (block 840), the adapter retrieves a previously created object associated with the specified class name (block 860), determines whether the retrieved object is valid (block 865), and uses the retrieved object to call the method specified by the #FILL_USING directive to determine the property value (block 855). If it is determined that the retrieved object is not valid (block 865), a new object is created (block 845), as discussed above. The adapter uses the determined property value to populate the common event format representation for the current message (block 870), and determines if there are any further fields for the rule (block 895).

Still referring to FIG. 8, if the value specified by the rule is #GENERATE_USING (block 810), the adapter parses the directive (block 815), determines whether the inner directive

NEW is present in the #GENERATE_USING directive (block 840), and either creates a new object or retrieves a previously created object to call the method specified by the #GENERATE_USING directive, as described above with reference to the #FILL_USING directive. Alternatively, if the value specified by the rule is neither #FILL_USING (block 805) or #GENERATE_USING (block 810), the adapter determines whether some other implicit directive is specified (block 875). If so, the adapter determines whether the specified directive is applicable to the properties of the current message (block 880). If so, the adapter executes a predetermined method for the property to determine the property value (block 885), uses the determined property value to populate the common event format representation for the current message (block 870), and determines if there are any further fields for the rule (block 895).

If additional fields are present, the adapter retrieves the next field and value (block 800), and the operations of FIG. 8 are repeated. If no other fields are present, the adapter determines if there are any further transformation routines (block 897), and if not, determines if there are any further messages/events (block 899). If further messages are present, the adapter retrieves the next message/event (i.e. a "new" current message) (block 710), and the operations of FIGS. 7-8 are repeated. Although the operations of FIGS. 7-8 have been described above as occurring sequentially, the operations of FIGS. 7-8 may be performed independently or in conjunction with each other.

The following examples illustrate exemplary rule sets using the exemplary directives described above according to some embodiments of the present invention:

Exemplary Rule Set #1

```xml
<?xml version="1.0" encoding="UTF-8"?>
<com.ibm.acad.app:Root
xmlns:com.ibm.acad.app="http://www.acad.ibm.com/App.xsd"
xmlns:com.ibm.acad.msg.extractor="http://www.acad.ibm.com/MsgExtractor.xsd"
xmlns:com.ibm.acad.outputter="http://www.acad.ibm.com/Outputter.xsd"
xmlns:com.ibm.acad.parser="http://www.acad.ibm.com/Parser.xsd"
xmlns:com.ibm.acad.sensor="http://www.acad.ibm.com/Sensor.xsd">
    <com.ibm.acad.app:Context Contextid="ACAdapterDefaultContext1">
      <com.ibm.acad.sensor:SensorConfig>
        <com.ibm.acad.sensor:SensorTypeOS Directory="c:\\" ExpectFor="0.0.0.1"
FileName="useprev_db2diag_short.log" SensorTypes="SENSOR_TYPE_OS_FILE"/>
      </com.ibm.acad.sensor:SensorConfig>
      <com.ibm.acad.msg.extractor:MsgExtractorConfig eventEnd=" " eventStart="^ (\d+-
\d+-\d+|PID.*TID.*Node.*)" glueing="::" matchContinue=" " multiline="true" separator="\s+"/>
      <com.ibm.acad.parser:ParserConfig hashing=":" separator=" |::">
        <com.ibm.acad.parser:RulesCBE>
          <com.ibm.acad.parser:GroupsSourceComponentId>
            <com.ibm.acad.parser:RuleAttComponent Description="Required property that
MUST be unique within scope of location" Name="component">
              <com.ibm.acad.parser:Subs Match=" " Name="Fixed" Positions=" "
Substitute="DB2_UDB" Value="DB2_UDB"/>
            </com.ibm.acad.parser:RuleAttComponent>
            <com.ibm.acad.parser:RuleAttSubComponent Description="Required property"
Name="subComponent">
              <com.ibm.acad.parser:Subs Match=".*Appid.*::(.*)\s+.*\s+Probe.*"
Description="Assumes appid will have either numbers or letters" Name="Anything between
appid and the field before probe" Substitute="$1" Value=" "/>
              <com.ibm.acad.parser:Subs Match="PID.*" Name="Use previous for secondary
messages" Positions="0" Substitute="#USE_PREVIOUS" Value="#USE_PREVIOUS"/>
              <com.ibm.acad.parser:Subs Match=" " Name="DefaultNone" Positions=" "
Substitute=" " Value=" "/>
            </com.ibm.acad.parser:RuleAttSubComponent>
            <com.ibm.acad.parser:RuleAttComponentIdType Description="Required
property - set to Application for WAS" Name="componentIdType">
              <com.ibm.acad.parser:Subs Match=" " Name="Fixed as ProductName"
Positions=" " Substitute="ProductName" Value="ProductName"/>
            </com.ibm.acad.parser:RuleAttComponentIdType>
            <com.ibm.acad.parser:RuleAttInstanceId Description="Optional Property"
Name="instanceId">
              <com.ibm.acad.parser:Subs Match="PID.*" Name="Secondary message always
starts with a PID" Positions="0" Substitute="#USE_PREVIOUS" Value=" "/>
              <com.ibm.acad.parser:Subs Name="Instance field for primary messages"
Positions="$h('Instance')" Substitute=" " Value="svtdbm3"/>
              <com.ibm.acad.parser:Subs Name="DefaultNone" Substitute=" " Value=" "/>
            </com.ibm.acad.parser:RuleAttInstanceId>
            <com.ibm.acad.parser:RuleAttApplication Description="optional property"
Name="application">
              <com.ibm.acad.parser:Subs Match="PID.*" Name="Secondary message - starts
with PID" Positions="0" Substitute="#USE_PREVIOUS" Value="#USE_PREVIOUS"/>
              <com.ibm.acad.parser:Subs Name="Use AppId field for primary messages"
Positions="$h('Appid')" Substitute=" " Value="*N0.svtdbm3.080157225650"/>
              <com.ibm.acad.parser:Subs Name="DefaultEmpty" Substitute=" " Value=" "/>
            </com.ibm.acad.parser:RuleAttApplication>
            <com.ibm.acad.parser:RuleAttExecutionEnvironment Description="Optional
property" Name="executionEnvironment">
              <com.ibm.acad.parser:Subs Name="DefaultEmpty" Substitute=" " Value=" "/>
            </com.ibm.acad.parser:RuleAttExecutionEnvironment>
            <com.ibm.acad.parser:RuleAttLocation Description="Required property if
```

-continued

```
sourceComponentId is present" Name="location">
          <com.ibm.acad.parser:Subs Name="ToBeFilledByAdapter"
Substitute="#ADAPTER" Value="#ADAPTER"/>
        </com.ibm.acad.parser:RuleAttLocation>
        <com.ibm.acad.parser:RuleAttLocationType Description="Required property if
sourcecomponentid is present" Name="locationType">
          <com.ibm.acad.parser:Subs Name="ToBeFilledByAdapter"
Substitute="#ADAPTER" Value="#ADAPTER"/>
        </com.ibm.acad.parser:RuleAttLocationType>
        <com.ibm.acad.parser:RuleAttProcessId Description="Optional property"
Name="processId">
          <com.ibm.acad.parser:Subs Match="(\d+).*" Description="PID always starts on
new line and goes on till TID .*::PID:(.*)TID" Name="For both primary and secondary log
messages" Positions="$h('PID')" Substitute="$1" Value="9290652"/>
          <com.ibm.acad.parser:Subs Name="DefaultNone" Substitute=" " Value=" "/>
        </com.ibm.acad.parser:RuleAttProcessId>
        <com.ibm.acad.parser:RuleAttThreadId Description="Optional property"
Name="threadId">
          <com.ibm.acad.parser:Subs Match=" " Description="TID is always on a separate
line together with PID in front of it" Name="For both primary and secondary messages"
Positions="$h('TID')" Substitute=" " Value="1"/>
          <com.ibm.acad.parser:Subs Name="DefaultNone" Substitute=" " Value=" "/>
        </com.ibm.acad.parser:RuleAttThreadId>
      </com.ibm.acad.parser:GroupsSourceComponentId>
      <com.ibm.acad.parser:GroupsMsgDataElement>
        <com.ibm.acad.parser:RuleAttMsgId Description="Optional in case of DB2"
Name="msgId">
          <com.ibm.acad.parser:Subs Match="::([A-Z]+\d+[A-Z])" Description="MsgId
always is first word in message which always begins on a new line" Name="3.4.1 message IDs"
Substitute="$1" Value=" "/>
          <com.ibm.acad.parser:Subs Name="DefaultEmpty" Substitute="NONE"
Value="NONE"/>
        </com.ibm.acad.parser:RuleAttMsgId>
        <com.ibm.acad.parser:RuleAttMsgType Description="Depends on what msgId
matched to" Name="msgIdType">
          <com.ibm.acad.parser:Subs Match="::([A-Z]+\d+[A-Z])"
Name="IBM3_4_1Type" Positions=" " Substitute="IBM3.4.1" Value=" "/>
          <com.ibm.acad.parser:Subs Name="Default None" Substitute="UNKNOWN"
Value="UNKNOWN"/>
        </com.ibm.acad.parser:RuleAttMsgType>
        <com.ibm.acad.parser:RuleAttMsgCatalogId Description="CatalogId is same as
msgId" Name="msgCatalogId">
          <com.ibm.acad.parser:Subs Name="DefaultNone" Positions=" " Substitute=" "
Value=" "/>
        </com.ibm.acad.parser:RuleAttMsgCatalogId>
        <com.ibm.acad.parser:RuleAttMsgCatalogTokens>
          <com.ibm.acad.parser:Subs Name="DefaultEmpty" Substitute=" " Value=" "/>
        </com.ibm.acad.parser:RuleAttMsgCatalogTokens>
        <com.ibm.acad.parser:RuleAttMsgCatalog Description="Catalog can be
specified" Name="msgCatalog">
          <com.ibm.acad.parser:Subs Name="EmptyMsgCatalog" Substitute=" " Value=" "/>
        </com.ibm.acad.parser:RuleAttMsgCatalog>
        <com.ibm.acad.parser:RuleAttMsgLocale Description="MsgLocale can be
determined or added by the Adapter" Name="msgLocale">
          <com.ibm.acad.parser:Subs Name="EmptyMsgLocale" Substitute=" " Value=" "/>
        </com.ibm.acad.parser:RuleAttMsgLocale>
      </com.ibm.acad.parser:GroupsMsgDataElement>
      <com.ibm.acad.parser:GroupsExtendedDataElement>
        <com.ibm.acad.parser:RuleAttType Description="Type of 'Process_Name'">
          <com.ibm.acad.parser:Subs Name="Fixed" Substitute="string"
Value="string"/>
        </com.ibm.acad.parser:RuleAttType>
        <com.ibm.acad.parser:RuleAttName Description="Process_Name">
          <com.ibm.acad.parser:Subs Match=" " Description="Process_Name always
starts on new line and goes on till TID " Name="For both primary and secondary log messages"
Substitute="Process_Name" Value="Process_Name"/>
        </com.ibm.acad.parser:RuleAttName>
        <com.ibm.acad.parser:RuleAttExDataValues>
          <com.ibm.acad.parser:Subs Match=".*::PID:\d+\((.*)\)\s+TID.*"
Description="Process_Name always starts on new line and goes on till TID " Name="For
primary log messages" Substitute="$1" Value=" "/>
          <com.ibm.acad.parser:Subs Match=" " Name="For secondary log messages"
Substitute="#USE_PREVIOUS" Value="#USE_PREVIOUS"/>
        </com.ibm.acad.parser:RuleAttExDataValues>
      </com.ibm.acad.parser:GroupsExtendedDataElement>
      <com.ibm.acad.parser:GroupsExtendedDataElement>
        <com.ibm.acad.parser:RuleAttType>
          <com.ibm.acad.parser:Subs Name="Fixed" Substitute="string"
```

```
Value="string"/>
          </com.ibm.acad.parser:RuleAttType>
          <com.ibm.acad.parser:RuleAttName>
            <com.ibm.acad.parser:Subs Match=" " Name="Database "
Substitute="Database" Value="Database"/>
          </com.ibm.acad.parser:RuleAttName>
          <com.ibm.acad.parser:RuleAttExDataValues>
            <com.ibm.acad.parser:Subs Match="Probe:\d+\s+Database:(.*)::::"
Name="Database value" Substitute="$1" Value=" "/>
            <com.ibm.acad.parser:Subs Name="DefaultNone" Substitute=" " Value=" "/>
          </com.ibm.acad.parser:RuleAttExDataValues>
        </com.ibm.acad.parser:GroupsExtendedDataElement>
        <com.ibm.acad.parser:GroupsExtendedDataElement>
          <com.ibm.acad.parser:RuleAttType Description="Type of Probe"
Name="Probe">
            <com.ibm.acad.parser:Subs Name="Fixed" Substitute="integer"
Value="integer"/>
          </com.ibm.acad.parser:RuleAttType>
          <com.ibm.acad.parser:RuleAttName Description="Probe">
            <com.ibm.acad.parser:Subs Match=" " Name="Probe" Substitute="Probe"
Value="Probe"/>
          </com.ibm.acad.parser:RuleAttName>
          <com.ibm.acad.parser:RuleAttExDataValues Description="Value of Probe">
            <com.ibm.acad.parser:Subs Match="Probe:(\d+)\s+Database" Name="Value of
Probe" Substitute="$1" Value=" "/>
            <com.ibm.acad.parser:Subs Name="DefaultNone" Substitute=" " Value=" "/>
          </com.ibm.acad.parser:RuleAttExDataValues>
        </com.ibm.acad.parser:GroupsExtendedDataElement>
        <com.ibm.acad.parser:GroupsExtendedDataElement>
          <com.ibm.acad.parser:RuleAttType Description="Type of Node">
            <com.ibm.acad.parser:Subs Name="Fixed" Substitute="integer"
Value="integer"/>
          </com.ibm.acad.parser:RuleAttType>
          <com.ibm.acad.parser:RuleAttName>
            <com.ibm.acad.parser:Subs Match=" " Description=" " Name="Node"
Positions=" " Substitute="Node" Value="Node"/>
          </com.ibm.acad.parser:RuleAttName>
          <com.ibm.acad.parser:RuleAttExDataValues>
            <com.ibm.acad.parser:Subs Match=" " Name="Value of Node"
Positions="$h('Node')" Value="000"/>
            <com.ibm.acad.parser:Subs Name="DefaultNone" Substitute=" " Value=" "/>
          </com.ibm.acad.parser:RuleAttExDataValues>
        </com.ibm.acad.parser:GroupsExtendedDataElement>
        <com.ibm.acad.parser:GroupsExtendedDataElement>
          <com.ibm.acad.parser:RuleAttType Description="Type for Function Name">
            <com.ibm.acad.parser:Subs Name="Fixed" Substitute="string"
Value="string"/>
          </com.ibm.acad.parser:RuleAttType>
          <com.ibm.acad.parser:RuleAttName Description="Function Name">
            <com.ibm.acad.parser:Subs Match=" " Name="Function Name occurs only in
the primary message" Substitute="Function" Value="Function"/>
          </com.ibm.acad.parser:RuleAttName>
          <com.ibm.acad.parser:RuleAttExDataValues Description="Value of Function
Name">
            <com.ibm.acad.parser:Subs Match="Appid.*::.*\s+(.*)\s+Probe"
Name="Function Name occurs only in the primary message" Substitute="$1" Value=" "/>
            <com.ibm.acad.parser:Subs Name="DefaultNone" Substitute=" " Value=" "/>
          </com.ibm.acad.parser:RuleAttExDataValues>
        </com.ibm.acad.parser:GroupsExtendedDataElement>
        <com.ibm.acad.parser:GroupsContextDataElement>
          <com.ibm.acad.parser:RuleAttType>
            <com.ibm.acad.parser:Subs Substitute="string" Value="string"/>
          </com.ibm.acad.parser:RuleAttType>
          <com.ibm.acad.parser:RuleAttName>
            <com.ibm.acad.parser:Subs Substitute="Title name" Value="Title name"/>
          </com.ibm.acad.parser:RuleAttName>
          <com.ibm.acad.parser:RuleAttContextValue>
            <com.ibm.acad.parser:Subs Substitute="Title value" Value="Title value"/>
          </com.ibm.acad.parser:RuleAttContextValue>
        </com.ibm.acad.parser:GroupsContextDataElement>
        <com.ibm.acad.parser:GroupsContextDataElement>
          <com.ibm.acad.parser:RuleAttType>
            <com.ibm.acad.parser:Subs Name="Fixed" Substitute="integer"
Value="integer"/>
          </com.ibm.acad.parser:RuleAttType>
          <com.ibm.acad.parser:RuleAttName>
            <com.ibm.acad.parser:Subs Name="Fixed" Substitute="Node" Value="Node"/>
          </com.ibm.acad.parser:RuleAttName>
          <com.ibm.acad.parser:RuleAttContextValue>
```

```
            <com.ibm.acad.parser:Subs Positions="$h('Node')" Value="000"/>
          </com.ibm.acad.parser:RuleAttContextValue>
        </com.ibm.acad.parser:GroupsContextDataElement>
        <com.ibm.acad.parser:RuleAttCreationTime Description=" "
Name="creationTime">
          <com.ibm.acad.parser:Subs Match=" " Positions="0" TimeFormat="y-M-d-
H.m.s.S" Value="PID:9290652"/>
          <com.ibm.acad.parser:Subs Name="Use previous" Substitute="-1" Value="-1"/>
        </com.ibm.acad.parser:RuleAttCreationTime>
        <com.ibm.acad.parser:RuleAttLocalInstanceId Description="source supplied event
identifier" Name="localInstanceId">
          <com.ibm.acad.parser:Subs Match=" " Name="To be filled by adapter"
Substitute="#ADAPTER" Value="#ADAPTER"/>
          <com.ibm.acad.parser:Subs Name="DefaultNone" Substitute=" " Value=" "/>
        </com.ibm.acad.parser:RuleAttLocalInstanceId>
        <com.ibm.acad.parser:RuleAttGlobalInstanceId Description="This of XML type
ID" Name="globalInstanceId">
          <com.ibm.acad.parser:Subs Match=" " Name="To be filled by adapter"
Substitute="#ADAPTER" Value="#ADAPTER"/>
          <com.ibm.acad.parser:Subs Name="DefaultNone" Substitute=" " Value=" "/>
        </com.ibm.acad.parser:RuleAttGlobalInstanceId>
        <com.ibm.acad.parser:RuleAttSeverity Description="this is a value between 0 and
60" Name="severity">
          <com.ibm.acad.parser:Subs Match="::[A-Z]+\d+C" Name="Fatal error message"
Substitute="60" Value=" "/>
          <com.ibm.acad.parser:Subs Match="::[A-Z]+\d+E" Name="Critical error
message" Substitute="50" Value=" "/>
          <com.ibm.acad.parser:Subs Match="::[A-Z]+\d+N" Description="Applies only to
general messages - not ADM and SQL" Name="Minor message with PID" Substitute="40"
Value=" "/>
          <com.ibm.acad.parser:Subs Match="::[A-Z]+\d+W" Name="Warning message"
Substitute="30" Value=" "/>
          <com.ibm.acad.parser:Subs Match="::[A-Z]+\d+I" Name="Info message"
Positions=" " Substitute="10" Value=" "/>
          <com.ibm.acad.parser:Subs Name="DefaultEmpty" Substitute="0" Value="0"/>
        </com.ibm.acad.parser:RuleAttSeverity>
        <com.ibm.acad.parser:RuleAttPriority Description="Optional property"
Name="priority">
          <com.ibm.acad.parser:Subs Name="DefaultEmpty" Substitute=" " Value=" "/>
        </com.ibm.acad.parser:RuleAttPriority>
        <com.ibm.acad.parser:RuleAttSituationType Description="As described in
Canonical Situations document" Name="situationType">
          <com.ibm.acad.parser:Subs Name="Unknown" Substitute="UNKNOWN"
Value="UNKNOWN"/>
        </com.ibm.acad.parser:RuleAttSituationType>
        <com.ibm.acad.parser:RuleAttMsg Description="Actual text portion"
Name="msg">
           <com.ibm.acad.parser:Subs Match="Database.*::::(.*)::" Description=" "
Name="Database present but PID after message absent" Substitute="$1" Value=" "/>
           <com.ibm.acad.parser:Subs Match="Probe:.*::::+(.*)::" Name="Database is
absent" Substitute="$1" Value=" "/>
           <com.ibm.acad.parser:Subs Name="DefaultNone" Substitute=" " Value=" "/>
         </com.ibm.acad.parser:RuleAttMsg>
         <com.ibm.acad.parser:RuleAttRepeatCount Description="Repeat count is
optional" Name="repeatCount">
           <com.ibm.acad.parser:Subs Name="NoRepeatCountInDB2Logs" Substitute=" "
Value=" "/>
         </com.ibm.acad.parser:RuleAttRepeatCount>
         <com.ibm.acad.parser:RuleAttElapsedTime Description="elapsedTime is
optional" Name="elapsedTime">
           <com.ibm.acad.parser:Subs Name="NoElapsedTimeInDB2Logs" Substitute=" "
Value=" "/>
         </com.ibm.acad,parser:RuleAttElapsedTime>
         <com.ibm.acad.parser:RuleAttExtensionName Description="extensionName is
fixed as common base event" Name="extensionName">
           <com.ibm.acad.parser:Subs Name="StaticCommonBaseEvent"
Substitute="CommonBaseEvent" Value="CommonBaseEvent"/>
         </com.ibm.acad.parser:RuleAttExtensionName>
       </com.ibm.acad.parser:RulesCBE>
     </com.ibm.acad.parser:ParserConfig>
        <com.ibm.acad.outputter:OutputterConfig>
           <com.ibm.acad.outputter:CommonsOutputter>
              <com.ibm.acad.outputter:AvailableSinks>
                <com.ibm.acad.outputter:Sink
className="com.ibm.acad.sinks.SimpleSink" enabled="true">
                   <com.ibm.acad.outputter:Config>
```

-continued

```
            outputLogFile=c:\\DB2CBEOut.log
                                </com.ibm.acad.outputter:Config>
                            </com.ibm.acad.outputter:Sink>
                            <com.ibm.acad.outputter:Sink
className="com.ibm.acad.sinks.WSADSink">
                                <com.ibm.acad.outputter:Config>
                                    agentName=DB2WSADMsgAgent
                                </com.ibm.acad.outputter:Config>
                            </com.ibm.acad.outputter:Sink>
                            <com.ibm.acad.outputter:Sink
className="com.ibm.acad.sinks.RegsSink">
                                <com.ibm.acad.outputter:Config>
        filterHandle=http://localhost:8080/ogsa/services/com/ibm/ogsa/regs/Filter
                                </com.ibm.acad.outputter:Config>
                            </com.ibm.acad.outputter:Sink>
                        </com.ibm.acad.outputter:AvailableSinks>
        <com.ibm.acad.outputter:BackupLogFile>c:\\backup.log</com.ibm.acad.outputter:BackupLogFile>
        <com.ibm.acad.outputter:ThrottleLevel>1</com.ibm.acad.outputter:ThrottleLevel>
                    </com.ibm.acad.outputter:CommonsOutputter>
                </com.ibm.acad.outputter:OutputterConfig>
                <com.ibm.acad.formatter:FormatterConfig>
                    <com.ibm.acad.formatter:MultiFormatter>
                        <com.ibm.acad.formatter:AvailableConverters>
                            <com.ibm.acad.formatter:Converter
className="com.ibm.acad.converter.CBEMsgConverter">
        <com.ibm.acad.cbeconverter:CBEMsgConverterConfig
xmlns:com.ibm.acad.cbeconverter="http://www.acad.ibm.com/CBEMsgConverter.xsd"
xmlns:xsi="http://www.w3.org/2001/XMLSchema-instance"
xsi:schemaLocation="http://www.acad.ibm.com/CBEMsgConverter.xsd CBEMsgConverter.xsd">
        <com.ibm.acad.cbeconverter:Memory enabled="true">
        <com.ibm.acad.cbeconverter:MemoryKey>sourceComponentId.processId</com.ibm.acad.
cbeconverter:MemoryKey>
        <com.ibm.acad.cbeconverter:MemoryKey>sourceComponentId.threadId</com.ibm.acad.
cbeconverter:MemoryKey>
        </com.ibm.acad.cbeconverter:Memory>
        </com.ibm.acad.cbeconverter:CBEMsgConverterConfig>
                            </com.ibm.acad.formatter:Converter>
                            <com.ibm.acad.formatter:Converter
className="com.ibm.acad.converter.StringConverter">
                                <com.ibm.acad.formatter:Config/>
                            </com.ibm.acad.formatter:Converter>
                        </com.ibm.acad.formatter:AvailableConverters>
                    </com.ibm.acad.formatter:MultiFormatter>
                </com.ibm.acad.formatter:FormatterConfig>
            </com.ibm.acad.app:Context>
        </com.ibm.acad.app:Root>
```

Exemplary Rule Set #2

```
        <?xml version=" 1.0" encoding="UTF-8"?>
        <com.ibm.acad.app:Root xmlns:com.ibm.acad.app="http://www.acad.ibm.com/App.xsd"
xmlns:com.ibm.acad.msg.extractor="http://www.acad.ibm.com/MsgExtractor.xsd"
xmlns:com.ibm.acad.parser="http://www.acad.ibm.com/Parser.xsd"
xmlns:com.ibm.acad.sensor="http://www.acad.ibm.com/Sensor.xsd">
        <com.ibm.acad.app:Context Contextid="ACAdapterDefaultContext1">
            <com.ibm.acad.sensor:SensorConfig>
              <com.ibm.acad.sensor:SensorTypeOS Directory=" " ExpectFor="0.0.0.1"
FileName="samples.txt" SensorTypes="SENSOR_TYPE_OS_FILE"/>
            </com.ibm.acad.sensor:SensorConfig>
            <com.ibm.acad.msg.extractor:MsgExtractorConfig eventEnd=" "
eventStart="^(\w{3}\s+\d{2}\s+)" glueing=" " matchContinue=" " separator=" "/>
            <com.ibm.acad.parser:ParserConfig hashing=" " separator=" ">
            <com.ibm.acad.parser:RulesCBE>
              <com.ibm.acad.parser:GroupsSourceComponentId>
                <com.ibm:acad.parser:RuleAttComponent Description="Required property that
MUST be unique within scope of location" Name="component">
                    <com.ibm.acad.parser:Subs Match=" " Name="Static Cisco Router" Positions=" "
Substitute="Cisco Catalyst 3550 Switch" Value="Cisco Catalyst 3550 Switch"/>
                </com.ibm.acad.parser:RuleAttComponent>
                <com.ibm.acad.parser:RuleAttSubComponent>
                  <com.ibm.acad.parser:Subs Substitute="UNKNOWN" Value="UNKNOWN"/>
                </com.ibm.acad.parser:RuleAttSubComponent>
                <com.ibm.acad.parser:RuleAttComponentIdType Description="Required property -
```

-continued

```
set to Application for WAS" Name="componentIdType">
            <com.ibm.acad.parser:Subs Match=" " Name="Static DeviceName" Positions=" "
Substitute="DeviceName" Value="DeviceName"/>
          </com.ibm.acad.parser:RuleAttComponentIdType>
          <com.ibm.acad.parser:RuleAttLocation>
            <com.ibm.acad.parser:Subs Match="(\w+)\.(\w+)\.(\w+)\.(\w+)"
Name="Whatever is in position 3"
Substitute="#FILL_USING(com.ibm.acad.samplecode.Helper,resolveIp,$1,$2,$3,$4)"
Positions="3" Value="howard"/>
          </com.ibm.acad.parser:RuleAttLocation>
          <com.ibm.acad.parser:RuleAttLocationType>
            <com.ibm.acad.parser:Subs Match="\d+.\d+.\d+.\d+" Name="IPv4 if Location
filled by IP Address" Positions="3" Substitute="IPv4" Value="IPv4"/>
            <com.ibm.acad.parser:Subs Name="HostName is location not filled by IP
address" Substitute="HostName" Value="HostName"/>
          </com.ibm.acad.parser:RuleAttLocationType>
        </com.ibm.acad.parser:GroupsSourceComponentId>
        <com.ibm.acad.parser:GroupsMsgDataElement>
          <com.ibm.acad.parser:RuleAttMsgId>
            <com.ibm.acad.parser:Subs Match="%(.*):" Description="Also can use based on
%" Name="Positional" Positions="6" Substitute="$1" Value="LINK-5-CHANGED"/>
            <com.ibm.acad.parser:Subs Match=".*\d+:\d+:\d+:.*%(.*?):\s.*" Name="Relative
postion - after second time stamp" Substitute="$1" Value="DUAL-5-NBRCHANGE"/>
            <com.ibm.acad.parser:Subs Name="MsgId may end up being empty"
Substitute=" " Value=" "/>
          </com.ibm.acad.parser:RuleAttMsgId>
          <com.ibm.acad.parser:RuleAttMsgType>
            <com.ibm.acad.parser:Subs Match="%.*:" Name="Based on message id"
Positions="6" Substitute="Cisco" Value="Cisco"/>
            <com.ibm.acad.parser:Subs Match=".*\d+:\d+:\d+:.*%(.*?):\s.*" Name="Based
on message id" Substitute="Cisco" Value="Cisco"/>
            <com.ibm.acad.parser:Subs Name="Empty" Substitute=" " Value=" "/>
          </com.ibm.acad.parser:RuleAttMsgType>
        </com.ibm.acad.parser:GroupsMsgDataElement>
        <com.ibm.acad.parser:GroupsExtendedDataElement>
          <com.ibm.acad.parser:RuleAttType>
            <com.ibm.acad.parser:Subs Name="Type is string" Substitute="string"
Value="string"/>
          </com.ibm.acad.parser:RuleAttType>
          <com.ibm.acad.parser:RuleAttName>
            <com.ibm.acad.parser:Subs Name="Name is interface" Substitute="interface"
Value="interface"/>
          </com.ibm.acad.parser:RuleAttName>
          <com.ibm.acad.parser:RuleAttExDataValues>
            <com.ibm.acad.parser:Subs Match=".*[Ii]nterface\s(.*),.*" Name="Interface
eyecatcher followed by interface value and a ," Substitute="$1" Value="Serial8/5"/>
            <com.ibm.acad.parser:Subs Match=".*\d+\.\d+\.\d+\.\d+\s+\((.*)\).*"
Name="IPv4 followed by interface value in paranthesis" Substitute="$1" Value="Serial3/1/1:5"/>
            <com.ibm.acad.parser:Subs Substitute=" " Value=" "/>
          </com.ibm.acad.parser:RuleAttExDataValues>
        </com.ibm.acad.parser:GroupsExtendedDataElement>
        <com.ibm.acad.parser:GroupsExtendedDataElement>
          <com.ibm.acad.parser:RuleAttType>
            <com.ibm.acad.parser:Subs Name="Type is string" Substitute="string"
Value="string"/>
          </com.ibm.acad.parser:RuleAttType>
          <com.ibm.acad.parser:RuleAttName>
            <com.ibm.acad.parser:Subs Name="Sample1" Substitute="Sample1"
Value="Sample1"/>
          </com.ibm.acad.parser:RuleAttName>
          <com.ibm.acad.parser:RuleAttExDataValues>
            <com.ibm.acad.parser:Subs Match="(.*)" Name="Demonstrate use of #NEW
with FILL_USING"
Substitute="#FILL_USING(#NEW:com.ibm.acad.samplecode.Helper,resolveIp,$1)"
Positions="3" Value="howard"/>
          </com.ibm.acad.parser:RuleAttExDataValues>
        </com.ibm.acad.parser:GroupsExtendedDataElement>
        <com.ibm.acad.parser:GroupsExtendedDataElement>
          <com.ibm.acad.parser:RuleAttType>
            <com.ibm.acad.parser:Subs Name="Type is string" Substitute="string"
Value="string"/>
          </com.ibm.acad.parser:RuleAttType>
          <com.ibm.acad.parser:RuleAttName>
            <com.ibm.acad.parser:Subs Name="Sample2" Substitute="Sample2"
Value="Sample2"/>
          </com.ibm.acad.parser:RuleAttName>
          <com.ibm.acad.parser:RuleAttExDataValues>
            <com.ibm.acad.parser:Subs Match=" " Name="Demonstrate use of #NEW with
```

-continued

```
GENERATE_USING"
Substitute="#GENERATE_USING(#NEW:com.ibm.acad.samplecode.Helper,dummyCall)"
Value=" "/>
          </com.ibm.acad.parser:RuleAttExDataValues>
        </com.ibm.acad.parser:GroupsExtendedDataElement>
        <com.ibm.acad.parser:RuleAttCreationTime Description=" "
Name="creationTime">
          <com.ibm.acad.parser:Subs Match="(\w{3}\s+\d+\s\d+:\d+:\d+).*"
Description="Year is not present in log file. So need to extract other fields and then add a static
year value to it" Name="First time stamp in message" Positions=" " Substitute="$1 2003"
TimeFormat="MMM d HH:mm:ss yyyy" Value="1048515591000"/>
        </com.ibm.acad.parser:RuleAttCreationTime>
        <com.ibm.acad.parser:RuleAttGlobalInstanceId Description="This of XML type
ID" Name="globalInstanceId">
          <com.ibm.acad.parser:Subs Match=" " Name=" " Positions=" "
Substitute="#GENERATE_USING(com.ibm.acad.samplecode.Helper,
generateGlobalInstanceId)" Value=" "/>
        </com.ibm.acad.parser:RuleAttGlobalInstanceId>
        <com.ibm.acad.parser:RuleAttSeverity Description="this is a value between 0 and
60" Name="severity">
          <com.ibm.acad.parser:Subs Match=".*%\S+-5-\S+:.*" Description="Based on
message id" Name="Notification - Harmless" Positions=" " Substitute="20" Value="20"/>
          <com.ibm.acad.parser:Subs Match=".*%\S+-3-\S+:.*" Description="Based on
message id" Name="Error - Minor" Positions=" " Substitute="40" Value="40"/>
          <com.ibm.acad.parser:Subs Match=".*%\S+-4-\S+:.*" Description="Based on
message id" Name="Warn - Warning" Positions=" " Substitute="30" Value="%LINK-3-
UPDOWN:"/>
          <com.ibm.acad.parser:Subs Match=".*%\S+-[67]-\S+:.*" Description="Based on
message id" Name="Debug and Informational - Info" Positions=" " Substitute="10" Value="10"/>
          <com.ibm.acad.parser:Subs Match=".*%\S+-[12]-\S+:.*" Description="Based on
message id" Name="1 and 2 become Critical" Positions=" " Substitute="50" Value="50"/>
          <com.ibm.acad.parser:Subs Match=".*%\S+-0-\S+:.*" Description="Based on
message id" Name="0 becomes Fatal" Positions=" " Substitute="60" Value="60"/>
          <com.ibm.acad.parser:Subs Name="Unknown" Substitute="0" Value="0"/>
        </com.ibm.acad.parser:RuleAttSeverity>
        <com.ibm.acad.parser:RuleAttSituationType Description="As described in
Canonical Situations document" Name="situationType">
          <com.ibm.acad.parser:Subs Match=".*[Ii]nterface.*changed state to
administratively down.*" Substitute="REPORT, NOT AVAILABLE, DOWN" Value="REPORT,
NOT AVAILABLE, DOWN"/>
          <com.ibm.acad.parser:Subs Match=".*[Ii]nterface.*changed state to up.*"
Substitute="REPORT, AVAILABLE, UP" Value="REPORT, AVAILABLE, UP"/>
          <com.ibm.acad.parser:Subs Match=".*[Ii]nterface.*changed state to down.*"
Substitute="REPORT, NOT AVAILABLE, DOWN" Value="REPORT, NOT AVAILABLE,
DOWN"/>
          <com.ibm.acad.parser:Subs Name="Unknown" Substitute="UNKNOWN"
Value="UNKNOWN"/>
          <com.ibm.acad.parser:Subs/>
        </com.ibm.acad.parser:RuleAttSituationType>
        <com.ibm.acad.parser:RuleAttMsg Description="Actual text portion"
Name="msg">
          <com.ibm.acad.parser:Subs Match=".*%\S+-\d-\S+:(.*)" Name="Whatever
follows the msg id" Positions=" " Substitute="$1" Value="IP-EIGRP 100: Neighbor 100.5.26.1
(Serial3/1/1:5) is down: holding time expired"/>
        </com.ibm.acad.parser:RuleAttMsg>
        <com.ibm.acad.parser:RuleAttExtensionName Description="extensionName is
fixed as common base event" Name="extensionName">
          <com.ibm.acad.parser:Subs Name="StaticCommonBaseEvent"
Substitute="CommonBaseEvent" Value="CommonBaseEvent"/>
        </com.ibm.acad.parser:RuleAttExtensionName>
      </com.ibm.acad.parser:RulesCBE>
    </com.ibm.acad.parser:ParserConfig>
    <com.ibm.acad.outputter:OutputterConfig>
        <com.ibm.acad.outputter:CommonsOutputter>
          <com.ibm.acad.outputter:AvailableSinks>
            <com.ibm.acad.outputter:Sink
className="com.ibm.acad.sinks.SimpleSink" enabled="true">
              <com.ibm.acad.outputter:Config>
    outputLogFile=c:\\SamplesCBEOut.log
              </com.ibm.acad.outputter:Config>
            </com.ibm.acad.outputter:Sink>
            <com.ibm.acad.outputter:Sink
className="com.ibm.acad.sinks.DeliverNotificationSink" >
              <com.ibm.acad.outputter:Config>
    targetURL=http://acdevx1.raleigh.ibm.com:9080/DeliveryNotificationShimEARWeb/servlet/
rpcrouter;
                    defaultDeliveryInterval=5;
                    deliveryPacketSize=500;
                    retryCount=2;
```

-continued

```
                                    severityBasedThresholds=50:2;
                                    traceDelivery=c:\\deliverytrace.out;
        situationsFilter=UNKNOWN:NONE
                                </com.ibm.acad.outputter:Config>
                            </com.ibm.acad.outputter:Sink>
                            <com.ibm.acad.outputter:Sink
className="com.ibm.acad.sinks.LTASink">
                                <com.ibm.acad.outputter:Config>
                                    agentName=DefaultLTASinkAgent
                                </com.ibm.acad.outputter:Config>
                            </com.ibm.acad.outputter:Sink>
                            <com.ibm.acad.outputter:Sink
className="com.ibm.acad.sinks.WSADSink">
                                <com.ibm.acad.outputter:Config>
        agentName=DefaultWSADSinkAgent
                                </com.ibm.acad.outputter:Config>
                            </com.ibm.acad.outputter:Sink>
                            <com.ibm.acad.outputter:Sink
className="com.ibm.acad.sinks.RegsSink">
                                <com.ibm.acad.outputter:Config>
            filterHandle=http://localhost:8080/ogsa/services/com/ibm/ogsa/regs/Filter
                                </com.ibm.acad.outputter:Config>
                            </com.ibm.acad.outputter:Sink>
                        </com.ibm.acad.outputter:AvailableSinks>
        <com.ibm.acad.outputter:BackupLogFile>c:\\backup.log</com.ibm.acad.outputter:BackupLogFile>
        <com.ibm.acad.outputter:ThrottleLevel>1</com.ibm.acad.outputter:ThrottleLevel>
                    </com.ibm.acad.outputter:CommonsOutputter>
                </com.ibm.acad.outputter:OutputterConfig>
                <com.ibm.acad.formatter:FormatterConfig>
                    <com.ibm.acad.formatter:MultiFormatter>
                        <com.ibm.acad.formatter:AvailableConverters>
                            <com.ibm.acad.formatter:Converter
className="com.ibm.acad.converter.StringConverter">
                                <com.ibm.acad.formatter:Config/>
                            </com.ibm.acad.formatter:Converter>
                            <com.ibm.acad.formatter:Converter
className="com.ibm.acad.converter.CBEMsgConverter">
                                <CBEMsgConverterConfig>
                                    <DuplicateFilter enabled="true">
        <DuplicatesArchiveFile>duplicates.log</DuplicatesArchiveFile>
                                    </DuplicateFilter>
                                </CBEMsgConverterConfig>
                            </com.ibm.acad.formatter:Converter>
                        </com.ibm.acad.formatter:AvailableConverters>
                    </com.ibm.acad.formatter:MultiFormatter>
                </com.ibm.acad.formatter:FormatterConfig>
        </com.ibm.acad.app:Context>
    </com.ibm.acad.app:Root>
```

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of generating a common event format representation of information from a plurality of messages, comprising:

parsing a rule associated with a current message to determine if a property of a common event format representation for the current message is to be populated with a property value from a previous message;

obtaining the property value from the previous message if the rule specifies to obtain the property value from the previous message, wherein obtaining the property value from the previous message comprises:

generating a computed key based on properties of the current message, wherein generating the computed key further includes:

identifying properties in the current message that are common to the previous message;

combining the identified properties to generate the computed key; and generating only a portion of the computed key sufficient to identify a previous message;

wherein obtaining the property value from the previous message comprises obtaining the property value from an immediately preceding message if the rule specifies to obtain the property value from the immediately preceding message or if obtaining the property value from the previous message is unsuccessful;

wherein the obtained property value from the previous message provides further directives for determining the property of the common event format representation for the current message;

identifying the previous message based on the key of the current message, wherein identifying the previous message comprises:

identifying the previous message based on a portion of the key;

generating a key for the previous message based on properties of the previous message; and comparing the key for the previous message with the key for the current message;

populating the common event format representation for the current message with the obtained property value from the previous message;

parsing the rule associated with the current message to determine if the property of the common event format representation for the current message is to be populated with a property value determined by a specified code;

obtaining the property value using the specified code if the rule specifies to obtain the property value using the specified code;

populating the common event format representation for the current message with the obtained property value obtained using the specified code;

storing the populated common event format representation as the current message;

wherein the rule specifies obtaining the property value from the specified code if obtaining the property value from the previous message is unsuccessful;

wherein the specified code calls a class and a particular method within the class to determine the property value;

wherein obtaining the property value from the specified code comprises re-using a property value from a previous execution of the specified code if the same class, method, and parameters as the previous execution are specified;

wherein the specified code creates a new object to call a method to determine the property value;

storing the new object against a called class, method, and parameters;

wherein the steps of parsing, obtaining, and populating includes:

parsing a rule associated with a current message to determine if a property of a common event format representation for the current message is to be populated with a property value from a previous message or if the property of the common event format representation for the current message is to be populated with a property value determined by specified code;

obtaining the property value from the previous message if the rule specifies obtaining the property value from the previous message, wherein obtaining the property value comprises:

generating a computed key based on properties of the current message that are common to the previous message; and identifying the previous message based on the computed key of the current message;

obtaining the property value from the specified code if the rule specifies to obtain the property value from the specified code, wherein the specified code calls a class and a particular method within the class to determine the property value; and populating the common event format representation for the current message with the obtained property value.

\* \* \* \* \*